(12) United States Patent
Han et al.

(10) Patent No.: US 12,445,160 B2
(45) Date of Patent: Oct. 14, 2025

(54) SIM MODULE MANAGEMENT METHOD AND ELECTRONIC DEVICE

(71) Applicant: HUAWEI TECHNOLOGIES CO., LTD., Guangdong (CN)

(72) Inventors: Jing Han, Beijing (CN); Xiaoquan Zhang, Beijing (CN); Haifeng Zhang, Beijing (CN); Qiang Tao, Beijing (CN); Tao Li, Beijing (CN); Jilei Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 331 days.

(21) Appl. No.: 17/925,936

(22) PCT Filed: May 11, 2021

(86) PCT No.: PCT/CN2021/092952
§ 371 (c)(1),
(2) Date: Nov. 17, 2022

(87) PCT Pub. No.: WO2021/233159
PCT Pub. Date: Nov. 25, 2021

(65) Prior Publication Data
US 2023/0188172 A1 Jun. 15, 2023

(30) Foreign Application Priority Data
May 18, 2020 (CN) .......................... 202010417129.8

(51) Int. Cl.
*H04B 1/38* (2015.01)
*H04B 1/3818* (2015.01)

(52) U.S. Cl.
CPC ................ *H04B 1/3818* (2015.01)

(58) Field of Classification Search
CPC ..................................................... H04B 1/3818
See application file for complete search history.

(56) References Cited

U.S. PATENT DOCUMENTS

| 2012/0135715 A1 | 5/2012 | Kang et al. |
| 2012/0159602 A1* | 6/2012 | Haynes ............. H04W 12/0431 |
| | | 726/9 |

(Continued)

FOREIGN PATENT DOCUMENTS

| CN | 101184293 A | 5/2008 |
| CN | 103298161 A | 9/2013 |

(Continued)

*Primary Examiner* — Junpeng Chen
(74) *Attorney, Agent, or Firm* — WOMBLE BOND DICKINSON (US) LLP

(57) ABSTRACT

Embodiments of this application provide a SIM module management method and an electronic device, and relate to the field of electronic devices. When an eSIM module is in position and it is detected that a second plug-in SIM module is inserted into a second SIM module interface, the electronic device detects whether a first plug-in SIM module is inserted into a first SIM module interface. If the first SIM module interface is connected to the first plug-in SIM module, a user is prompted to select the second plug-in SIM module or the eSIM module. If the first SIM module interface is not connected to the first plug-in SIM module, the user is prompted to connect the second plug-in SIM module to the first SIM module interface.

13 Claims, 29 Drawing Sheets

(56) References Cited

U.S. PATENT DOCUMENTS

| | | | |
|---|---|---|---|
| 2017/0094628 A1* | 3/2017 | Miao | H04W 60/005 |
| 2017/0127217 A1* | 5/2017 | Miao | H04W 76/15 |
| 2017/0180550 A1* | 6/2017 | Geo | H04M 7/0042 |
| 2017/0195947 A1* | 7/2017 | Korneluk | H04W 48/04 |
| 2018/0109942 A1 | 4/2018 | Lipovkov | |
| 2018/0302781 A1 | 10/2018 | Lee et al. | |
| 2019/0098487 A1* | 3/2019 | Boettger | H04W 8/183 |
| 2019/0230496 A1 | 7/2019 | Wane | |
| 2021/0185745 A1* | 6/2021 | Chinnakkannu | H04W 76/16 |
| 2023/0188172 A1 | 6/2023 | Han et al. | |

FOREIGN PATENT DOCUMENTS

| | | |
|---|---|---|
| CN | 104066210 A | 9/2014 |
| CN | 106465464 A | 2/2017 |
| CN | 106488439 A | 3/2017 |
| CN | 106535158 A | 3/2017 |
| CN | 106658464 A | 5/2017 |
| CN | 106658470 A | 5/2017 |
| CN | 106817257 A | 6/2017 |
| CN | 109587676 A | 4/2019 |
| CN | 109788494 A | 5/2019 |
| CN | 109983706 A | 7/2019 |
| CN | 110621013 A | 12/2019 |
| EP | 3337204 A1 | 6/2018 |
| EP | 2438794 B1 | 4/2019 |
| WO | 2013061275 A1 | 5/2013 |
| WO | 2019164212 A1 | 8/2019 |

* cited by examiner

SIM MODULE MANAGEMENT METHOD AND ELECTRONIC DEVICE

This application is a National Stage of International Application No. PCT/CN2021/092952, filed on May 11, 2021, which claims priority to Chinese Patent Application No. 202010417129.8, filed on May 18, 2020. Both of the aforementioned applications are hereby incorporated by reference in their entireties.

TECHNICAL FIELD

This application relates to the field of electronic devices, and in particular, to a subscriber identity module (SIM) module management method and an electronic device.

BACKGROUND

With continuous progress of science and technologies, electronic devices such as mobile phones have become first-choice tools for communication in people's daily life and work. When the electronic device accesses a cellular mobile network, a SIM module needs to be used to implement authentication. Currently, for a conventional SIM module, a user needs to apply for and activate the SIM module at a customer service center of a carrier, or select a number at an online customer service center of the carrier to access the network. Then, the carrier sends the SIM module to the user through express delivery. After receiving the SIM module, the user completes the activation. The activated SIM module can be used only after being inserted into a physical card slot of the electronic device. Consequently, timeliness and experience are not very good. In view of this, an embedded-SIM (eSIM) technology emerges. In the eSIM technology, a universal integrated circuit card is embedded into an electronic device, that is, an embedded universal integrated circuit card (eUICC) is obtained. The eUICC may store a plurality of types of eSIM profiles of a carrier, and each type of eSIM profile may independently form a SIM application. The SIM application may be referred to as an eSIM module.

As is known to all, most mobile phones now use conventional SIM modules. Gradual evolution from conventional SIM cards to eSIM cards is an inevitable trend. Currently, there are mobile phones that support the eSIM cards. The eSIM module and the conventional SIM module are compatible on the mobile phone, so that the user and the carrier can gradually transit from the conventional SIM module to the eSIM module. In a dual-SIM mobile phone, the mobile phone can support two modules of two conventional SIM modules and one eSIM module, to implement a dual-SIM single-standby function or a dual-SIM dual-standby function. However, due to hardware limitations, the eSIM card occupies one SIM card slot, and only one of a physical card in the card slot and the eSIM card can be powered on. Therefore, when the eSIM card is used, a status of the physical card in the card slot cannot be obtained. In this case, the user cannot detect an insertion of the physical card.

SUMMARY

Embodiments of this application provide a SIM module management method and an electronic device. For an electronic device that supports dual SIM modules and an eSIM module, a solution of detecting insertion of a physical card and giving a prompt when an eSIM card is used is provided, so that a user can also detect an insertion of the physical card when the eSIM card is used.

The following technical solutions are used in this application.

According to a first aspect, an embodiment of this application provides an electronic device. The electronic device may include: a processor, a first modem, a second modem, a mobile communication module, a first subscriber identity module SIM module interface, a second SIM module interface, and an embedded universal integrated circuit card eUICC. The eUICC is configured to store an embedded subscriber identity module eSIM module, a first smart card interface SCI, and a second SCI.

The processor is coupled to the first modem, the second modem, the mobile communication module, the first SIM module interface, the second SIM module interface, and the eUICC.

One end of the first SCI is coupled to the processor, and the other end is coupled to the second SIM module interface and the eUICC.

One end of the second SCI is coupled to the processor, and the other end is coupled to the first SIM module interface and the eUICC.

The processor is configured to control a connection relationship between the first SIM module interface, the second SIM module interface, and the eUICC and the first modem and the second modem.

According to the technical solution, a solution that supports an eSIM module is provided for an existing electronic device that supports dual SIM modules, so that the dual SIM modules are compatible with the eSIM module. In other words, the electronic device in this embodiment of this application may support three SIM modules, and can arbitrarily select, based on user settings, two SIM modules from the three SIM modules to be in an online standby mode, or can arbitrarily select one SIM module from the three SIM modules to be in an online standby mode.

In an embodiment, the processor is further configured to: when the eUICC is connected to the first SCI and it is detected that a second plug-in SIM module is connected to the second SIM module interface and a first plug-in SIM module is connected to the first SIM module interface, provide first prompt information. The first prompt information is used to prompt that at most two of the first plug-in SIM module, the second plug-in SIM module, and the eSIM module are simultaneously used.

According to the technical solution, when the eSIM module is in position, and the first plug-in SIM module and the second plug-in SIM module are both connected to the SIM module interfaces, a user can be prompted to arbitrarily select two SIM modules from the three SIM modules to be in an online standby mode. This avoids a case in which insertion in the second SIM module is ignored because the eSIM module is in position.

In an embodiment, the processor is further configured to: when the eUICC is connected to the first SCI and it is detected that a second plug-in SIM module is connected to the second SIM module interface and the first SIM module interface is not connected to a first plug-in SIM module, automatically connect the eUICC to the second SCI, and connect the second SIM module interface to the first SCI.

According to the technical solution, when the eSIM module is in position and the second plug-in SIM module is connected to the second SIM module interface, a card slot of the eSIM module can be intelligently switched. A user does not need to know a support capability of a SIM module inside the electronic device. When interfaces are sufficient, the user can automatically switch a card slot, to implement a dual-SIM online standby mode.

In an embodiment, the processor is further configured to: when the eUICC is connected to the first SCI and it is detected that a second plug-in SIM module is connected to the second SIM module interface and the first SIM module interface is not connected to a first plug-in SIM module, provide second prompt information. The second prompt information is used to prompt whether to switch the eUICC to the first SIM module interface.

According to the technical solution, when the eSIM module is in position and the second plug-in SIM module is connected to the second SIM module interface, a user can be prompted to switch a card slot of the eSIM module. In this embodiment of this application, the eUICC and the second SIM module interface can be simultaneously coupled to the first SCI, and the eUICC and the first SIM module interface can be simultaneously coupled to the second SCI. Therefore, when the first SIM module interface is not connected to the first plug-in SIM module, a location of the second plug-in SIM module does not need to be changed, and the eSIM module and the second plug-in SIM module can be simultaneously used provided that the card slot of the eSIM module is switched to the first SIM module interface.

In an embodiment, the processor is further configured to: when an input operation performed based on the second prompt information is received and the eUICC is kept connected to the first SCI, provide third prompt information. The third prompt information is used to prompt to connect the second plug-in SIM module to the first SIM module interface.

According to the technical solution, when the user does not agree to switch the eUICC to the first SIM module interface, the user can be prompted for another option of implementing dual-SIM online standby mode. In other words, the electronic device is allowed to automatically switch the card slot of the eSIM module, and a card slot of the second plug-in SIM module can be manually replaced, so that a dual-SIM online standby mode is implemented.

In an embodiment, the processor is further configured to perform the following operations when detecting that the eSIM module is installed and activated:

The processor obtains card information of the eSIM module.

If the first SIM module interface is not connected to a first plug-in SIM module and the second SIM module interface is connected to a second plug-in SIM module, the processor downloads the eSIM module to the first SIM module interface.

According to the technical solution, when the eSIM module is installed and activated, the eSIM module can be automatically downloaded to an empty card slot. In this way, a user does not need to perform selection; and after the downloading, the user can normally use the electronic device.

In an embodiment, the processor is further configured to perform the following operations when detecting that the eSIM module is installed and activated:

The processor obtains card information of the eSIM module.

If the first SIM module interface is not connected to a first plug-in SIM module and the second SIM module interface is connected to a second plug-in SIM module, the processor provides fourth prompt information. The fourth prompt information is used to prompt to download the eSIM module to the first SIM module interface.

According to the technical solution, when the eSIM module is installed and activated, a user can be helped to check an empty card slot, and the user is prompted to download the eSIM module to the empty card slot. This improves intelligence of downloading the eSIM module.

In an embodiment, the processor is further configured to perform the following operations when detecting that the eSIM module is installed and activated:

The processor obtains card information of the eSIM module.

If the first SIM module interface is connected to a first plug-in SIM module and the second SIM module interface is connected to a second plug-in SIM module, the processor provides fifth prompt information. The fifth prompt information is used to prompt to disable the first plug-in SIM module or the second plug-in SIM module.

According to the technical solution, when the eSIM module is installed and activated, a user can be helped to check a card slot occupation status. When there is no empty card slot, the user is prompted to disable the plug-in SIM module before using the eSIM module.

According to a second aspect, an embodiment of this application provides a SIM module management method. The method may be applied to an electronic device, and the electronic device may include a processor, a first SIM module interface, a second SIM module interface, and an embedded universal integrated circuit card eUICC. The eUICC is configured to store an embedded subscriber identity module eSIM module and a first smart card interface SCI.

One end of the first SCI is coupled to the processor, and the other end is coupled to the second SIM module interface and the eUICC. The electronic device is connected to a network through either of a second plug-in SIM module and a currently activated eSIM module in the eUICC, and a first plug-in SIM module.

When the eUICC is connected to the first SCI and it is detected that the second SIM module interface is connected to the second plug-in SIM module, the electronic device performs the following operations:

detecting whether the first SIM module interface is connected to the first plug-in SIM module; and if the first SIM module interface is connected to the first plug-in SIM module, providing sixth prompt information, where the sixth prompt information is used to prompt to connect the second SIM module interface to the second plug-in SIM module or the eSIM module; or if the first SIM module interface is not connected to the first plug-in SIM module, providing seventh prompt information, where the seventh prompt information is used to prompt to connect the second plug-in SIM module to the first SIM module interface.

According to the technical solution, an electronic device that supports dual SIM modules and an eSIM module can intelligently process a case where the second plug-in SIM module is connected to the second SIM module interface when the eSIM module is in position. In other words, the electronic device in this embodiment of this application may support three SIM modules. When the eSIM module is in position and the second plug-in SIM module is inserted, a prompt can be provided to a user with reference to a status of the first SIM module interface. This improves card change experience of the user.

According to a third aspect, an embodiment of this application provides a SIM module management method. The method may be applied to an electronic device, and the electronic device may include a processor, a first SIM module interface, a second SIM module interface, and an embedded universal integrated circuit card eUICC. The eUICC is configured to store an embedded subscriber identity module eSIM module and a first smart card interface SCI.

One end of the first SCI is coupled to the processor, and the other end is coupled to the second SIM module interface and the eUICC. The electronic device is connected to a network through either of a second plug-in SIM module and a currently activated eSIM module in the eUICC, and a first plug-in SIM module.

When the eUICC is connected to the first SCI and it is detected that a card tray configured to carry the first plug-in SIM module and the second plug-in SIM module is removed, the electronic device provides eighth prompt information. The eighth prompt information is used to prompt to connect the first plug-in SIM module or the second plug-in SIM module to the first SIM module interface.

According to the technical solution, an electronic device that supports dual SIM modules and an eSIM module can intelligently process a case where the second plug-in SIM module is connected to the second SIM module interface when the eSIM module is in position. In other words, the electronic device in this embodiment of this application may support three SIM modules. When the eSIM module is in position and a card tray is removed, a corresponding card insertion prompt can be provided to a user. This improves card change experience of the user.

According to a fourth aspect, an embodiment of this application provides a SIM module management method. The method may be applied to the electronic device in the first aspect. The electronic device is connected to a network through two of a first plug-in SIM module, a second plug-in SIM module, and a currently activated eSIM module in an eUICC. The method includes:
  when the eUICC is connected to a first SCI and it is detected that the second plug-in SIM module is connected to a second SIM module interface, the electronic device performs the following operations:
  detecting whether a first SIM module interface is connected to the first plug-in SIM module; and
  if the first plug-in SIM module is connected to the first SIM module interface, providing first prompt information, where the first prompt information is used to prompt that at most two of the first plug-in SIM module, the second plug-in SIM module, and the eSIM module are simultaneously used.

According to the technical solution, when the eSIM module is in position and the second plug-in SIM module is connected to the SIM module interface, a user can be prompted, with reference to a connection state of the first SIM module interface, to arbitrarily select two SIM modules from the three SIM modules to be in an online standby mode. This avoids a case in which insertion in the second SIM module is ignored because the eSIM module is in position.

In an embodiment, the method further includes: if the first SIM module interface is not connected to the first plug-in SIM module, automatically connecting the eUICC to a second SCI.

According to the technical solution, when the eSIM module is in position and the second plug-in SIM module is connected to the second SIM module interface, a card slot of the eSIM module can be intelligently switched. A user does not need to know a support capability of a SIM module inside the electronic device. When interfaces are sufficient, the user can automatically switch a card slot, to implement a dual-SIM online standby mode.

In an embodiment, the method further includes: if the first SIM module interface is not connected to the first plug-in SIM module, providing second prompt information, where the second prompt information is used to prompt whether to switch the eUICC to the first SIM module interface.

According to the technical solution, when the eSIM module is in position and the second plug-in SIM module is connected to the second SIM module interface, a user can be intelligently prompted to switch a card slot of the eSIM module.

In an embodiment, after providing the second prompt information, the method further includes:
  when an input operation performed based on the second prompt information is received and the eUICC is kept connected to the first SCI, providing third prompt information, where the third prompt information is used to prompt to connect the second plug-in SIM module to the first SIM module interface.

According to the technical solution, when the user does not agree to switch the eUICC to the first SIM module interface, the user can be prompted for another option of implementing dual-SIM online standby mode. In other words, the electronic device is allowed to automatically switch the card slot of the eSIM module, and a card slot of the second plug-in SIM module can be manually replaced, so that a dual-SIM online standby mode is implemented.

According to a fifth aspect, an embodiment of this application provides a computer-readable storage medium, including computer instructions. When the computer instructions are run on an electronic device, the electronic device is enabled to perform the SIM module management method according to any one of the second aspect to the fourth aspect or the possible implementations of the second aspect to the fourth aspect.

According to a sixth aspect, an embodiment of this application provides a computer program product. When the computer program product is run on a computer, the computer is enabled to perform the SIM module management method according to any one of the second aspect to the fourth aspect or the possible implementations of the second aspect to the fourth aspect.

According to a seventh aspect, an embodiment of this application provides a chip system. The chip system is applied to an electronic device. The chip system includes an interface circuit and a processor. The interface circuit and the processor are interconnected by using a line. The interface circuit is configured to receive a signal from a memory of the electronic device, and send the signal to the processor. The signal includes computer instructions stored in the memory. When the processor executes the computer instructions, the chip system performs the SIM module management method according to any one of the second aspect or the possible implementations of the second aspect.

It may be understood that the computer-readable storage medium in the fifth aspect, the computer program product in the sixth aspect, and the chip system in the seventh aspect all correspond to the methods in the second to the fourth aspects. Therefore, for advantageous effects that can be achieved by the computer-readable storage medium in the fifth aspect, the computer program product in the sixth aspect, and the chip system in the seventh aspect, refer to advantageous effects in the corresponding SIM module management method provided above. Details are not described herein again.

DESCRIPTION OF EMBODIMENTS

Figure 1A:
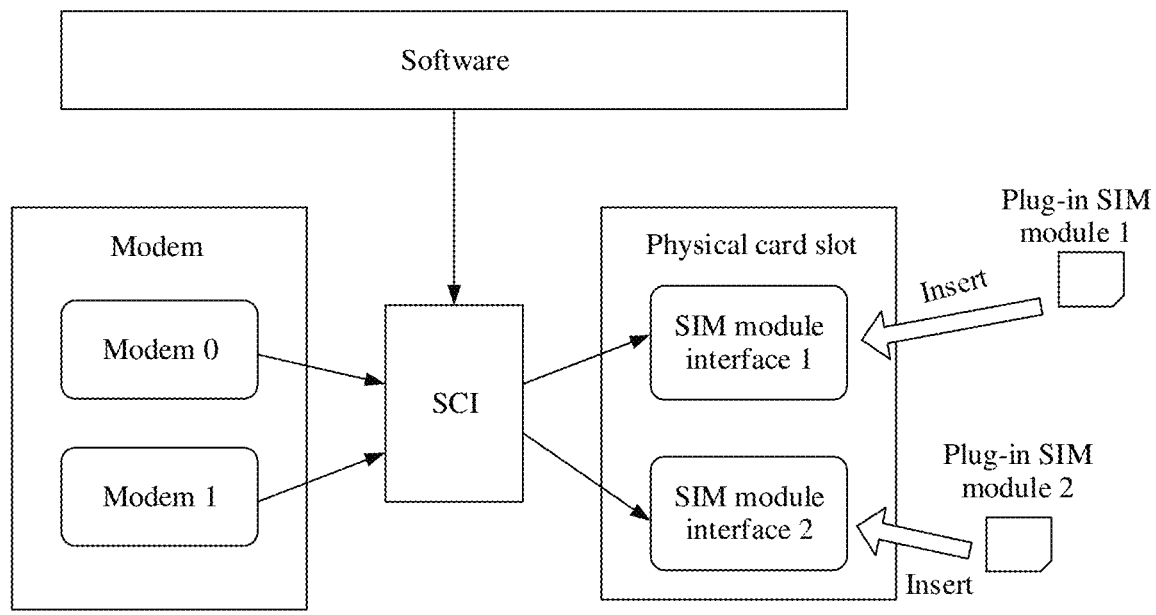
FIG. 1A is a schematic diagram of a structure of an electronic device supporting dual plug-in SIM modules according to an embodiment of this application.

For ease of understanding, example descriptions of some concepts related to embodiments of this application are provided for reference. Details are described as follows:

Plug-in SIM module: The plug-in SIM module is a conventional SIM module, or is referred to as a SIM module chip. This type of SIM module can be used only after a user selects a number to access a network at a customer service center of a carrier or through an online customer service center of the carrier, and the SIM module is inserted into a physical card slot (or referred to as a SIM module interface) of an electronic device after being activated. For example, the electronic device may be connected to a cellular mobile network through the SIM module, to implement functions such as calling and data communication. The plug-in SIM module can also be removed from the physical card slot.

eSIM module: The eSIM module is referred to as an embedded-SIM, or an embedded SIM module. In the eSIM module, a pluggable physical entity in the plug-in SIM module is abandoned, and a universal integrated circuit card (UICC) is embedded in an electronic device (not detachable from the electronic device), instead of being added to the electronic device as an independent removable component, which is referred to as an embedded UICC, an eUICC, or is referred to as an eSIM module chip. The eUICC may store a plurality of types of eSIM profiles of a carrier, and each type of eSIM profile may independently form a SIM application. The SIM application may be referred to as an eSIM module. The eSIM module may implement a function similar to that of the plug-in SIM module. The eSIM module allows a user to more flexibly select carrier packages or change a carrier at any time without unlocking a device or purchasing a new device. There are two packaging forms of the eUICC. One is a surface mount device (SMD) chip packaging process, that is, a SIM module chip is directly soldered to a module of the electronic device. The other is a SIP (Simple in Package) packaging process, that is, the SIM module chip and a module chip of the electronic device are packaged together, and appear to be one chip on the outside. The eSIM module is an unpluggable SIM module that can be used in any electronic device. A major difference between the eSIM module and the plug-in SIM module is that the eSIM module is fixed in the electronic device and cannot be replaced randomly.

Both the plug-in SIM module and the eSIM module may be referred to as a hard SIM module. An identifier used to identify the plug-in SIM module and the eSIM module may be referred to as an integrate circuit card identity (ICCID). An identifier used to identify the eUICC may be referred to as an embedded universal integrated circuit card identifier (eUICC identifier, EID).

softSIM module: The softSIM module is also referred to as a virtual-SIM (vSIM) module. It is a SIM module different from the hard SIM module. The softSIM module is a virtual entity, that is, there is no physical SIM module, and communication is implemented based on software and hardware of a communication module. A communication module with a vSIM function works with bottom-layer software customized for the vSIM to implement built-in encrypted storage of data (such as IMSI and KI). During network login, authentication, and communication, corresponding logic is automatically processed, so that stable mobile communication experience is provided without the physical SIM module.

Multi-SIM single-standby function: The multi-SIM single-standby function may mean that an electronic device such as a mobile phone may be connected to a plurality of SIM modules at the same time, and only one SIM module of the plurality of SIM modules may be in an online standby mode. In other words, the electronic device may be connected to the cellular mobile network through only one of the SIM modules, so as to be used for data exchange, and implement functions such as calling and data communication.

Multi-SIM dual-standby function: The multi-SIM dual-standby function may mean that an electronic device such as a mobile phone may be connected to a plurality of SIM modules at the same time, and two SIM modules of the plurality of SIM modules may be in an online standby mode at the same time. In other words, the electronic device may be connected to the cellular mobile network through two of the SIM modules at the same time, so as to be used for data exchange, and implement functions such as calling and data communication.

It should be noted that the plurality of SIM modules may refer to two or more SIM modules. In addition, each of the plurality of SIM modules may be the plug-in SIM module, the eSIM module, or the softSIM module.

Currently, an eSIM technology is gradually widely used on products such as a tablet computer and a personal computer (PC) in addition to a wearable device. In addition, the eSIM module tends to be used on the mobile phone.

In the conventional technology, the mobile phone supports only the plug-in SIM module, or supports only the eSIM module, or supports one plug-in SIM module and one eSIM module, to implement a dual-SIM dual-standby function. Currently, there are a large quantity of mobile phones that support dual SIM modules in the market, and a proportion of dual-SIM module users is also high. The dual SIM modules may be two plug-in SIM modules, or may be one plug-in SIM module and one softSIM module.

The electronic device in embodiments of this application may support three SIM modules. The three SIM modules include at least one eSIM module. The remaining two SIM modules may be both plug-in SIM modules, or may be one plug-in SIM module and one softSIM module. A user can arbitrarily select two SIM modules from the three SIM modules to be in an online standby mode, or can arbitrarily select one SIM module from the three SIM modules to be in an online standby mode.

In addition, in embodiments of this application, each of the three SIM modules supported by the electronic device may be a SIM module that supports any one of a global system for mobile communication (GSM) standard, a universal mobile telecommunications system (UMTS) standard, a time division-synchronous code division multiple access (TD-SCDMA) standard, a long term evolution (long term evolution, LTE) standard, and a code division multiple access (CDMA) standard. A standard supported by a SIM module in the electronic device is not limited in embodiments.

For ease of description, in the following embodiments, an example in which the electronic device supports two plug-in SIM modules and one eSIM module is used to describe embodiments of this application in detail.

For example, FIG. 1A is a schematic diagram of a structure of an electronic device supporting dual plug-in SIM modules according to an embodiment of this application. As shown in FIG. 1, the electronic device may include a SIM module interface 1 and a SIM module interface 2 (a SIM module interface may also be referred to as a physical card slot, that is, the electronic device may include a physical card slot 1 and a physical card slot 2), which can be separately configured to connect to a plug-in SIM module. For example, the SIM module interface 1 may be configured to connect to a plug-in SIM module 1, and the SIM module interface 2 may be configured to connect to a plug-in SIM module 2. The electronic device further includes a modem 0, a modem 1, and a smart card interface (SCI). Software at an upper layer of the hardware may control connection relationships between different modems and different SIM module interfaces through the SCI based on a user selection. When the two SIM module interfaces are both connected to a plug-in SIM module, the electronic device may be connected to a cellular mobile network through each plug-in SIM module and a modem connected to the plug-in SIM module, so as to perform data exchange, implement functions such as calling and data communication, and implement a dual-SIM dual-standby function.

Figure 1B:
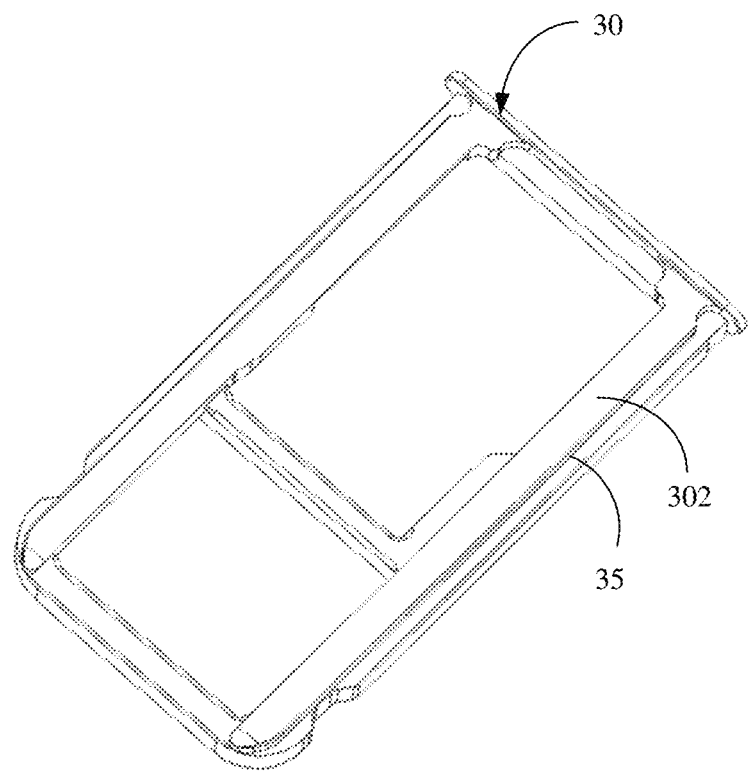
FIG. 1B is a schematic diagram of a card tray.

Refer to FIG. 1B. A card tray 30 includes a surface 302, and two card slots are disposed on the surface 302, to accommodate the plug-in SIM module 1 and the plug-in SIM module 2. A slideway 35 cooperating with a card holder of the electronic device is disposed on the surface 302, and the card tray slides and cooperates with the card holder by using the slideway 35, so that the plug-in SIM module 1 and the plug-in SIM module 2 are installed on the card holder.

Figure 2:
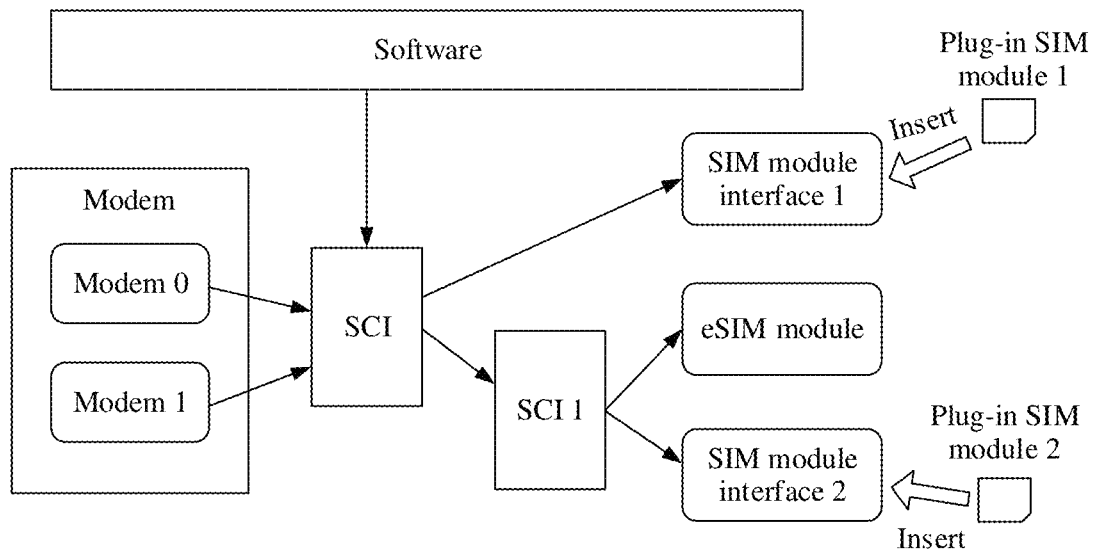
FIG. 2 is a schematic diagram of a structure of an electronic device supporting dual plug-in SIM modules and an eSIM module according to an embodiment of this application.

FIG. 2 is a schematic diagram of a structure of an electronic device supporting dual plug-in SIM modules and an eSIM module according to an embodiment of this application. As shown in FIG. 2, in addition to the components of the electronic device shown in FIG. 1, the electronic device may further include an eSIM module (or an eUICC, where the eUICC is configured to store the eSIM module), and an SCI 1. The SCI 1 cooperates with the SCI, to control connection relationships between different modems and different SIM module interfaces or the eSIM module (or the eUICC). When the two SIM module interfaces (namely, physical card slots) are both connected to a plug-in SIM module, and the eSIM module is activated, the electronic device may be connected to a cellular mobile network through two of the three SIM modules (for example, two plug-in SIM modules, or one plug-in SIM module and one eSIM module), and modems connected to the SIM modules, so as to perform data exchange, implement functions such as calling and data communication, and implement a three-SIM dual-standby function.

Certainly, when neither of the two SIM module interfaces is connected to the plug-in SIM module, and only the eSIM module is activated, the electronic device may also be connected to the cellular mobile network through the eSIM module and a modem connected to the eSIM module. Alternatively, when a SIM module interface 1 is connected to the plug-in SIM module, but a SIM module interface 2 is not connected to the plug-in SIM module, and the eSIM module is activated, the electronic device may also be connected to the cellular mobile network through the plug-in SIM module, the eSIM module, and modems connected to the plug-in SIM module and the eSIM module. Alternatively, when the SIM module interface 2 is connected to the plug-in SIM module, but the SIM module interface 1 is not connected to the plug-in SIM module, and the eSIM module is activated, the electronic device may be connected to the cellular mobile network through the plug-in SIM module or the eSIM module, and a modem connected to the plug-in SIM module or the eSIM module. Alternatively, when the two SIM module interfaces are both connected to the plug-in SIM module, but the eSIM module is not activated, the electronic device may also be connected to the cellular mobile network through the two plug-in SIM modules and modems connected to the two plug-in SIM modules. Alternatively, when either of the two SIM module interfaces is connected to the plug-in SIM module, and the eSIM module is not activated, the electronic device may also be connected to the cellular mobile network through the plug-in SIM module and a modem connected to the plug-in SIM module.

In addition, it should be noted that, in this embodiment of this application, the schematic diagram of the structure of the electronic device supporting dual plug-in SIM modules and an eSIM module in FIG. 2 is shown by using an example in which the eSIM module (or the eUICC) is connected to the SIM module interface 2 in hardware. That is, only one of the eSIM module and the plug-in SIM module 2 inserted into the SIM module interface 2 can be in an online standby mode. In other words, only the plug-in SIM module 1 inserted into the SIM module interface 1, and the eSIM module or the plug-in SIM module 2 inserted into the SIM module interface 2 can implement a dual-standby function. In some other embodiments, in hardware, the eSIM module (or the eUICC) may alternatively be connected to the SIM module interface 1. In this way, only one of the eSIM module and the plug-in SIM module 1 inserted into the SIM module interface 1 can be in an online standby mode. In other words, only the plug-in SIM module 2 inserted into the SIM module interface 2, and the eSIM module or the plug-in SIM module 1 inserted into the SIM module interface 1 can implement the dual-standby function.

Figure 3:
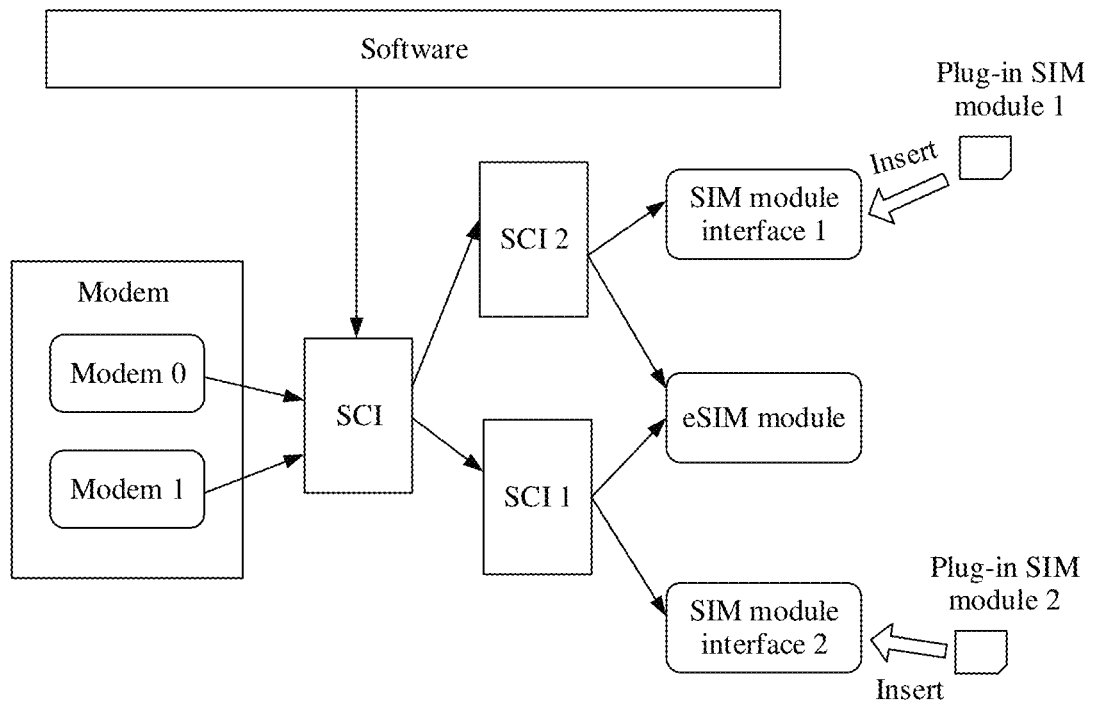
FIG. 3 is a schematic diagram of a structure of another electronic device supporting dual plug-in SIM modules and an eSIM module according to an embodiment of this application.

In some other embodiments, in hardware, the eSIM module (or the eUICC) may alternatively be connected to both the SIM module interface 1 and the SIM module interface 2. For example, as shown in FIG. 3, in addition to hardware of the electronic device shown in FIG. 2, the electronic device may further include an SCI 2. The SCI 2, the SCI 1, and the SCI cooperate to control connection relationships between different modems and different SIM module interfaces or different eSIM modules. In this way, the plug-in SIM module 1, and the eSIM module or the plug-in SIM module 2 may implement the dual-standby function. In addition, the plug-in SIM module 2, and the eSIM module or the plug-in SIM module 1 may further implement the dual-standby function.

Functions of the SCI, the SCI 1, and the SCI 2 may be implemented by hardware, or may be implemented by software. If the functions are implemented by the hardware, the hardware may be a GPIO pin of a chip. If the functions are implemented by the software, the software may be a driver of a modem. This is not limited in the embodiments. For example, the SCI 1 and the SCI 2 are implemented by hardware, and the hardware may be the GPIO pin of the chip. The SCI is implemented by a processor, which may be a modem driver or an instruction running on the processor.

For the electronic device shown in FIG. 2, in hardware, the eSIM module (or the eUICC) is connected to the SIM module interface 2, that is, only one of the eSIM module and the plug-in SIM module 2 inserted into the SIM module interface 2 can be in an online standby mode. With reference to FIG. 2, based on a user selection, one of the SIM module interface 2 and the eSIM module may be controlled to connect to a modem through cooperation of the SCI 1 and the SCI, so that one of the eSIM module and the plug-in SIM module 2 inserted into the SIM module interface 2 can be in an online standby mode.

Figure 4A:
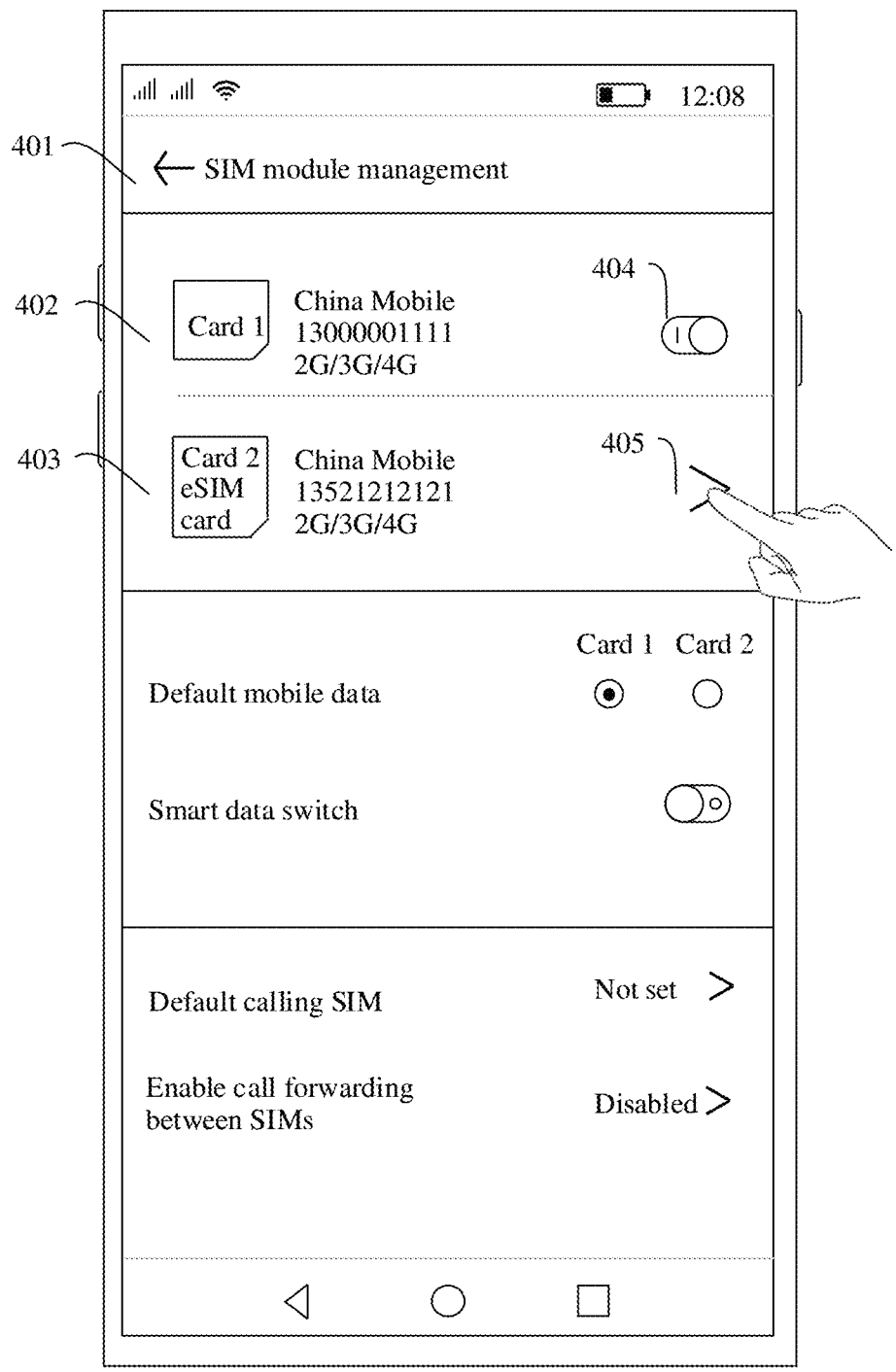
FIG. 4A and FIG. 4B are schematic diagrams of SIM module management interfaces according to an embodiment of this application.

In an example, as shown in FIG. 4A, on presentation of a SIM module management interface 401, an icon "card 1" 402 corresponds to the plug-in SIM module 1 inserted into the SIM interface 1, and a control, for example, a button 404, corresponding to the icon "card 1" 402 may be configured to set the plug-in SIM module 1. An icon "card 2" 403 corresponds to an eSIM module and the plug-in SIM module 2 inserted into the SIM interface 2, and a control, for example, a control 405, corresponding to the icon "card 2" 403 may be configured to set the plug-in SIM module 2 and the eSIM module. When the eSIM module is in an online standby mode, to enable the user to learn that the eSIM module is currently selected, on the SIM module management interface 401, the icon "card 2" 403 corresponding to the eSIM module and the plug-in SIM module 2 inserted into the SIM interface 2 includes a word "eSIM card". The user may perform a tap operation on the control 405 corresponding to the icon "card 2" 403.

Figure 4B:
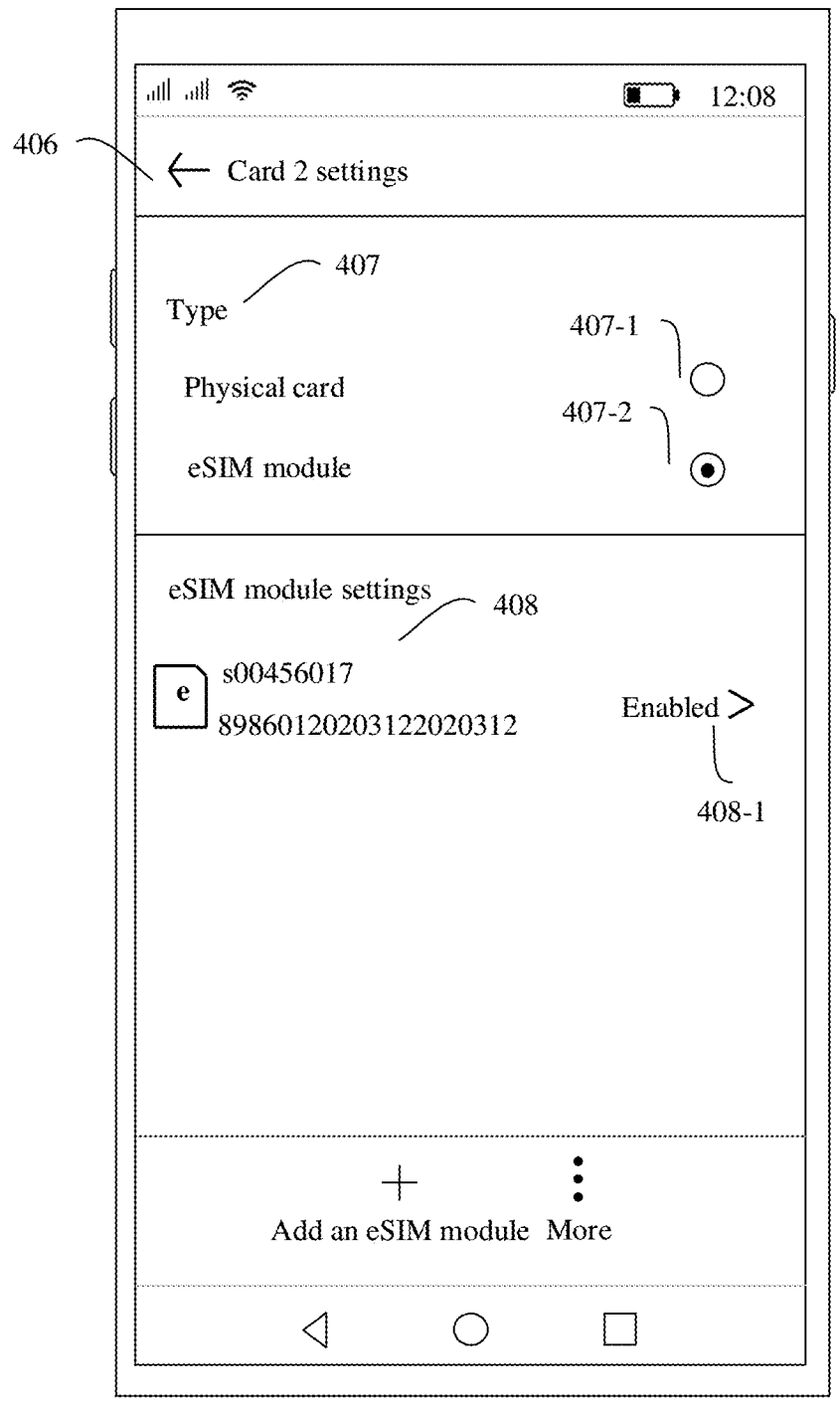

As shown in FIG. 4B, in response to the tap operation on the control 405, a mobile phone may display a card 2 setting interface 406. The card 2 setting interface 406 includes a "type" option 407. The user may use the "type" option 407 to select one of the SIM module 2 and the eSIM module to be in an online standby mode. For example, the user may select, by selecting a button 407-1 or a button 407-2, one of the plug-in SIM module 2 and the eSIM module to be in an online standby mode. For example, with reference to FIG. 2, if the user selects the button 407-1 and does not select the button 407-2, based on the user selection, the mobile phone controls the SIM module interface 2 to be connected to the modem through cooperation of the SCI 1 and the SCI, so that the plug-in SIM module 2 inserted into the SIM module interface 2 is in an online standby mode. It should be noted that FIG. 4B shows the interface by using an example in which the eSIM module is in an online standby mode by default, that is, the eSIM module is connected to the modem by default. In other words, this example is shown by using an example in which the mobile phone displays the card 2 setting interface 406 shown in FIG. 4B in response to the tap operation on the control 405.

In addition, in this embodiment of this application, the card 2 setting interface 406 shown in FIG. 4B is shown as a lower-level interface of the SIM module management interface 401 shown in FIG. 4A. In some other embodiments, content included on the card 2 setting interface 406 may alternatively be included on the SIM module management interface 401. In an embodiment, the content included on the card 2 setting interface 406 may be temporarily hidden from display, and displayed after an operation of the user is received. For example, after receiving the tap operation performed by the user on the control 405 corresponding to the icon "card 2" 403, the mobile phone displays a display menu on the SIM module management interface 401. The menu includes the content included on the card 2 setting interface 406. The content included on the card 2 setting interface 406 may alternatively be directly displayed on the SIM module management interface 401.

For example, when the eSIM module (namely, the eSIM card) shown in FIG. 4B is in an online standby mode, a physical card (namely, the plug-in SIM module 2) is inserted into the SIM module interface 2, and the card 2 setting interface 406 shown in FIG. 4B does not change. This is because, due to a hardware limitation, only one of a physical card in the card slot 2 and the eSIM card can be powered on at a same moment. Therefore, when the eSIM card is used, a status of the physical card in the card slot 2 cannot be obtained. As a result, the user cannot detect that only one physical card is inserted. In other words, when the eSIM is used, if a physical card needs to be replaced or a physical card is inserted into an incorrect card slot, the mobile phone does not provide an obvious interface prompt. In this case, the user may have a misunderstanding about whether the card is successfully inserted, and mistakenly consider that an error occurs during card insertion. Even if the user considers that the card is successfully inserted, the user needs to manually switch between the eSIM and the physical card. In this case, automatic switch cannot be performed or a next operation is not prompted.

For the foregoing complex operations of switching between an eSIM card and a physical card, embodiments of this application provide a convenient SIM module management method. After a physical card is inserted into a mobile phone, an eSIM is automatically switched to a corresponding modem, or a corresponding user interface prompt is provided when hardware does not support the switching.

For example, an electronic device in an embodiment of the application may be a device that can be connected to at least two plug-in SIM modules and supports an eSIM module. For example, the electronic device may be a mobile phone, a smart band, a smart watch, a tablet computer, or the like. A form of the electronic device is not limited in the embodiments. The following embodiments use a mobile phone as an example to describe how an electronic device that can be connected to at least two plug-in SIM modules and supports an eSIM module implements the technical solution in the embodiments.

The following describes the implementations of embodiments of this application in detail with reference to accompanying drawings.

Figure 5:
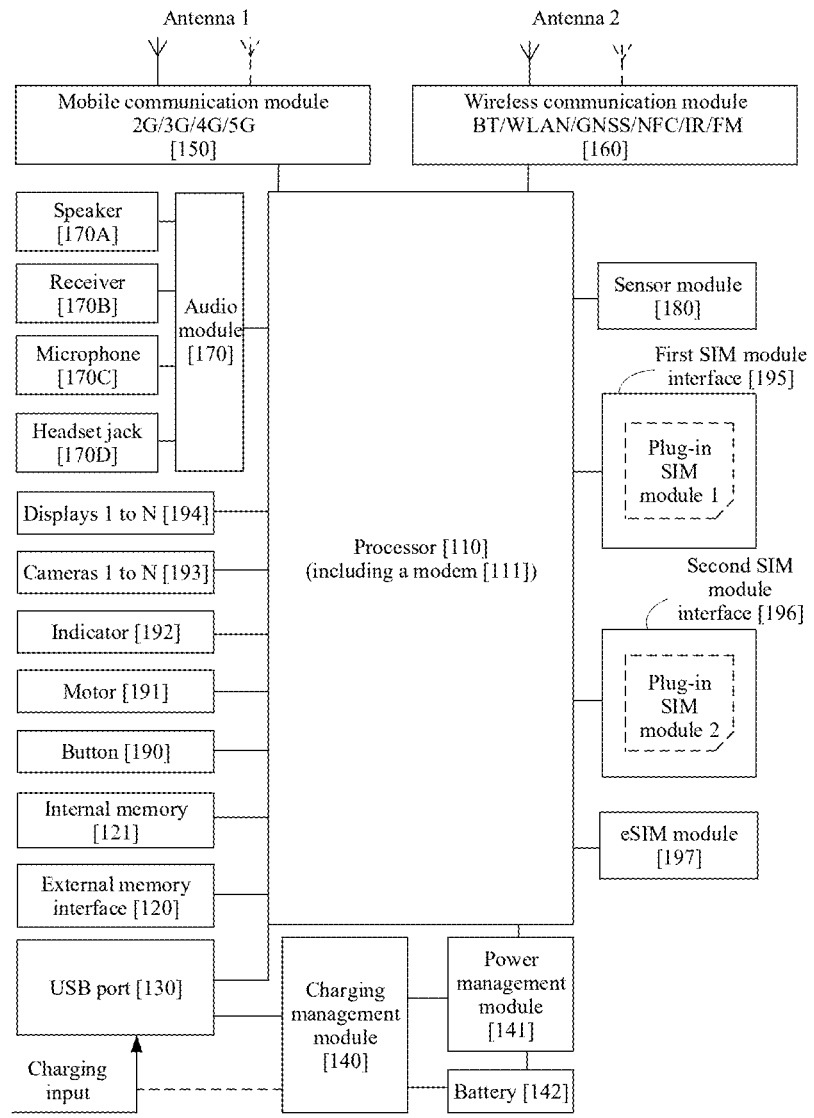
FIG. 5 is a schematic diagram of a hardware structure of an electronic device according to an embodiment of this application.

FIG. 5 is a schematic diagram of a hardware structure of an electronic device according to an embodiment of this application. As shown in FIG. 5, the electronic device may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 160, a speaker 160A, a receiver 160B, a microphone 160C, a headset jack 160D, a sensor module 170, a button 180, a motor 191, an indicator 192, a camera 193, a display 194, a first SIM module interface 195, a second SIM module interface 196, an eSIM module 197 (or an eUICC included in the electronic device, where the eUICC is configured to store the eSIM module 197), and the like.

It can be understood that the structure shown in this embodiment does not constitute a limitation on the electronic device. In some other embodiments, the electronic device may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem 111, a graphics processing unit (GPU), an image signal processor (ISP), a controller, a memory, a video codec, a digital signal processor (DSP), a baseband processor, a neural-network processing unit (NPU) and/or the like. Different processing units may be independent devices, or may be integrated into one or more processors. The processor 110 may be configured to implement the functions of the foregoing SCI.

The controller may be a nerve center and a command center of the electronic device. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, an SIM interface, a USB port, and/or the like.

The first SIM module interface 195 (for example, a SIM module interface 1) may be configured to connect to a plug-in SIM module 1. The plug-in SIM module 1 is inserted into the first SIM module interface 195 or removed from the first SIM module interface 195, to implement contact with or separation from the electronic device. The second SIM module interface 196 (for example, a SIM module interface 2) may be configured to connect to a plug-in SIM module 2. The plug-in SIM module 2 is inserted into the second SIM module interface 196 or removed from the second SIM module interface 196, to implement contact with or separation from the electronic device. The electronic device may be connected to a network through the plug-in SIM module 1 and/or the plug-in SIM module 2, to implement functions such as calling and data communication.

For example, the first SIM module interface 195 and the second SIM module interface 196 may be SIM module connectors, including a main body having SIM module accommodating space, and a plurality of communication slots for receiving conductive terminals of the SIM module. A SIM module interface may perform signaling transmission with the SIM module through the conductive terminal and the slot. In addition, the first SIM module interface 195 and the second SIM module interface 196 may support a plurality of SIM module sizes, that is, the module interfaces may be compatible with different types of SIM modules such as a nano-SIM module, a micro-SIM module, and the SIM module. The first SIM module interface 195 and the second SIM module interface 196 may also be compatible with an external storage card.

A universal integrated circuit card embedded in the electronic device is referred to as an eUICC. The eUICC may store a plurality of types of eSIM profiles of a carrier, and each type of eSIM profile may independently form a SIM application. The SIM application may be referred to as the eSIM module 197. The electronic device may be connected to the network through the eSIM module 197, to implement functions such as calling and data communication.

The charging management module 140 is configured to receive a charging input from a charger. The charger may be a wireless charger or a wired charger. The charging management module 140 supplies power to the electronic device through the power management module 141 while charging the battery 142.

The power management module 141 is configured to connect to the battery 142, the charging management module 140, and the processor 110. The power management module 141 receives an input from the battery 142 and/or the charging management module 140, to supply power to the processor 110, the internal memory 121, an external memory, the display 194, the camera 193, the wireless communication module 160, and the like. In some other embodiments, the power management module 141 may alternatively be disposed in the processor 110. In some other embodiments, the power management module 141 and the charging management module 140 may be alternatively disposed in a same device.

A wireless communication function of the electronic device may be implemented through the antenna 1, the antenna 2, the mobile communication module 150, the wireless communication module 160, the modem 111, the baseband processor, and the like.

The antenna 1 and the antenna 2 are configured to transmit and receive an electromagnetic wave signal. Each antenna of the electronic device may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G, 3G, 4G, 5G, or the like and that is applied to the electronic device. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit a processed electromagnetic wave to the modem 111 for demodulation. The mobile communication module 150 may further amplify a signal modulated by the modem 111, and convert an amplified signal into an electromagnetic wave through the antenna 1 for radiation. In some embodiments, at least some functional modules in the mobile communication module 150 may be disposed in the processor 110. In some embodiments, at least some functional modules in the mobile communication module 150 and at least some modules of the processor 110 may be disposed in a same device.

The modem 111 may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 160A, the receiver 160B, or the like), or displays an image or a video on the display 194. In some embodiments, the modem 111 may be an independent device. In some other embodiments, the modem 111 may be independent of the processor 110, and is disposed in a same device together with the mobile communication module 150 or another functional module.

The wireless communication module 160 may provide a wireless communication solution that is applied to the electronic device and that includes a wireless local area network (WLAN) (such as a wireless fidelity (Wi-Fi) network), Bluetooth (BT), a global navigation satellite system (GNSS), frequency modulation (FM), a near field communication (NFC) technology, an infrared (IR) technology, and the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device, the antenna 1 and the mobile communication module 150 are coupled, and the antenna 2 and the wireless communication module 160 are coupled, so that the electronic device can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GNSS), a BeiDou navigation satellite system (BDS), a quasi-zenith satellite system (QZSS), and/or a satellite based augmentation system (SBAS).

The electronic device implements a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a Miniled, a MicroLed, a Micro-oLed, a quantum dot light-emitting diode (QLED), or the like. In some embodiments, the electronic device may include one or N displays 194, where N is a positive integer greater than 1.

The electronic device may implement a photographing function by using the ISP, the camera 193, the video codec, the GPU, the display 194, the application processor, and the like. The ISP may be configured to process data fed back by the camera 193. The ISP may further perform algorithm optimization on noise, brightness, and complexion of an image. The ISP may further optimize parameters such as exposure and a color temperature of a photographing scenario. In some embodiments, the ISP may be disposed in the camera 193. The camera 193 is configured to capture a static image or a video. In some embodiments, the electronic device may include one or N cameras 193, where N is a positive integer greater than 1.

The external memory interface 120 may be configured to connect to an external storage card, for example, a micro SD card, to extend a storage capability of the electronic device. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device and data processing. The internal memory 121 may include a program storage area and a data storage area. The program storage area may store an operating system, an application required by at least one function (for example, a sound playing function or an image playing function), and the like. The data storage area may store data (such as audio data and a phone book) created when the electronic device is used, and the like. In addition, the internal memory 121 may include a high speed random access memory, or may include a nonvolatile memory, for example, at least one magnetic disk storage device, a flash storage device, or a universal flash storage (UFS).

The electronic device may implement audio functions such as music playing and recording, through the audio module 160, the speaker 160A, the receiver 160B, the microphone 160C, the headset jack 160D, the application processor, and the like.

The audio module 160 is configured to convert digital audio information into an analog audio signal for output, and is also configured to convert an analog audio input into a digital audio signal. The audio module 160 may be further configured to encode and decode an audio signal. In some embodiments, the audio module 160 may be disposed in the processor 110, or some functional modules in the audio module 160 are disposed in the processor 110.

The speaker 160A, also referred to as a "loudspeaker", is configured to convert an audio electrical signal into a sound signal. The electronic device may be configured to listen to music or answer a call in a hands-free mode over the speaker 160A.

The receiver 160B, also referred to as an "earpiece", is configured to convert an audio electrical signal into a sound signal. When a call is answered or voice information is received by using the electronic device, the receiver 160B may be put close to a human ear to listen to a voice.

The microphone 160C, also referred to as a "mike" or a "mic", is configured to convert a sound signal into an electrical signal. When making a call or sending voice information or triggering the electronic device by using a voice assistant to perform some functions, a user may make a sound through a mouth by approaching the microphone 160C, and type the sound signal to the microphone 160C. At least one microphone 160C may be disposed in the electronic device. In some other embodiments, two microphones 160C may be disposed in the electronic device, to collect a sound signal and implement a noise reduction function. In some other embodiments, three, four, or more microphones 160C may alternatively be disposed in the electronic device, to collect a sound signal, implement noise reduction, recognize a sound source, implement a directional recording function, and the like.

The headset jack 160D is configured to connect to a wired headset. The headset jack 160D may be a USB port 130, or may be a 3.5 mm open mobile terminal platform (OMTP) standard interface or cellular telecommunications industry association of the USA (CTIA) standard interface.

The button 180 includes a power button, a volume button, and the like. The button 180 may be a mechanical button, or may be a touch button. The electronic device may receive a button input, and generate a button signal input related to user settings and function control of the electronic device. The motor 191 may generate a vibration prompt. The motor 191 may be configured to provide an incoming call vibration prompt or a touch vibration feedback. The indicator 192 may be an indicator light, and may be configured to indicate a charging status and a power change, or may be configured to indicate a message, a missed call, a notification, and the like.

In addition, a software system of the electronic device may use a layered architecture, an event-driven architecture, a microcore architecture, a micro-service architecture, or a cloud architecture. In this embodiment of this application, an Android system with a layered architecture is used as an example to describe a software structure of the electronic device.

Figure 6:
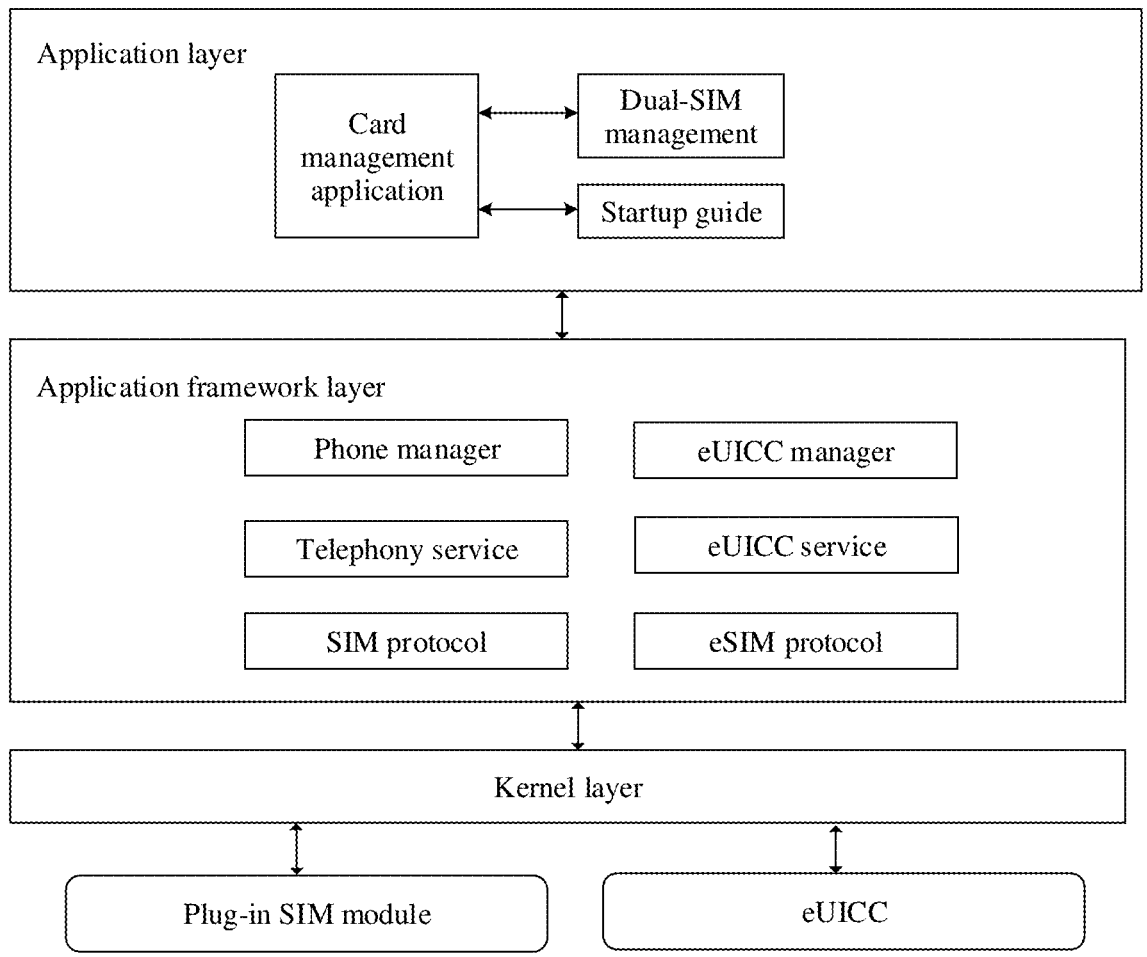
FIG. 6 is a schematic diagram of a software architecture of an electronic device according to an embodiment of this application.

FIG. 6 is a schematic diagram of a software architecture of an electronic device according to an embodiment of this application. In a layered architecture, software is divided into several layers, and each layer has a clear role and task. The layers communicate with each other through a software interface. In some embodiments, an Android system is divided into three layers: an application layer, an application framework layer, and a kernel layer from top to bottom.

The application layer may include a series of application packages. For example, the application package may include a card management application, Amazon, WeChat, Settings, Calculator, Camera, Phone, Messages, and the like.

As shown in FIG. 6, the card management application may provide various card management functions and corresponding management interfaces for the user. For example, the card management application may provide a SIM module management function and a corresponding interface for the user, so that the user can perform dual-SIM management, for example, set an eSIM module. For another example, during startup, the card management application may provide a startup guide service and a corresponding interface for the user, so that the user may add an eSIM module during startup.

The application framework layer provides an application programming interface (API) and a programming framework for an application at the application layer. The framework is a base of an operating framework of the electronic device. For example, in this embodiment of this application, the framework may include a telephony manager, a telephony service, an eUICC manager, and an eUICC service.

The telephony manager, the telephony service, the eUICC manager, and the eUICC service may provide an API related to a card operation for an upper-layer card management application. The upper-layer card management application may implement a corresponding card management function by invoking the API related to the card operation. For example, the card management application may invoke the related API based on settings of a plug-in SIM module by the user, and perform a corresponding configuration on the plug-in SIM module by using the telephony manager and the telephony service in cooperation with a SIM protocol. The card management application may further invoke the related API based on settings of an eSIM module by the user, and perform a corresponding configuration on the eSIM module by using the eUICC manager and the eUICC service in cooperation with an eSIM protocol. In this way, with reference to FIG. 2 or FIG. 3, when the two SIM module interfaces (namely, the SIM module interface 1 and the SIM module interface 2) are both connected to a plug-in SIM module, and the eSIM module is activated, the electronic device may implement a three-SIM dual-standby function.

Certainly, with reference to FIG. 2 or FIG. 3, when neither of the two SIM module interfaces is connected to the plug-in SIM module, and only the eSIM module is activated, or when the SIM module interface 1 is connected to the plug-in SIM module, but the SIM module interface 2 is not connected to the plug-in SIM module, and the eSIM module is activated, or when the SIM module interface 2 is connected to the plug-in SIM module, but the SIM module interface 1 is not connected to the plug-in SIM module, and the eSIM module is activated, or when the two SIM module interfaces are both connected to the plug-in SIM module, but the eSIM module is not activated, or when either of the two SIM module interfaces is connected to the plug-in SIM module, and the eSIM module is not activated, the electronic device may also implement a corresponding function, so as to interact with a network.

The kernel layer is a layer between hardware and software. For example, in this embodiment of this application, the kernel layer is a layer between a hardware plug-in SIM module and the eUICC, and an upper-layer framework and the application layer. The kernel layer may include various drivers such as a display driver and an audio driver.

In this embodiment, the card management application may further download an eSIM profile from an eSIM server (for example, subscription manager-data preparation+ (subscription manager-data preparation+, SM-DP+)) based on a user operation, and invoke the related API to write the downloaded eSIM profile into the eUICC by using the eUICC manager and the eUICC service in cooperation with the eSIM protocol. The eSIM profile may be further updated. The eSIM profile may independently form a SIM application, that is, form the eSIM module.

All methods in the following embodiments may be implemented in an electronic device having the foregoing hardware structure and software architecture.

A SIM module management method provided in the embodiments of this application may be applied to an electronic device that supports dual plug-in SIM modules and an eSIM module. In the following embodiments, an example in which the electronic device is a mobile phone and a structure of the electronic device is shown in FIG. 5 is used for description. In the following embodiments, the SIM module interface 1 is a first SIM module interface in this application, the SIM module interface 2 is a second SIM module interface in this application, the plug-in SIM module 1 is a first plug-in SIM module in this application, and the plug-in SIM module 2 is a second plug-in SIM module in this application.

In some embodiments of this application, if a status of a SIM module (for example, the plug-in SIM module or the eSIM module) in the mobile phone changes, the mobile phone usually needs to perform card setting.

The mobile phone may determine that the status of the SIM module in the mobile phone changes when detecting that any one of the following cases occurs: a SIM module interface (for example, the SIM module interface 1 or the SIM module interface 2) changes from a state of not connecting to the plug-in SIM module to a state of connecting to the plug-in SIM module (or the plug-in SIM module is inserted into a SIM module interface), the SIM module interface changes from the state of connecting to the plug-in SIM module to the state of not connecting to the plug-in SIM module (or the plug-in SIM module is removed from the SIM module interface), the plug-in SIM module changes from an enabled state to a disabled state, the eSIM module changes from an enabled state to a disabled state, a new eSIM module is added and activated, or an original activated eSIM module is deleted.

For example, after a user inserts or removes the plug-in SIM module, the mobile phone may determine that the status of the SIM module in the mobile phone changes.

For example, when a SIM module interface (for example, the SIM module interface 1 or the SIM module interface 2) is not connected to the plug-in SIM module, after the user inserts the plug-in SIM module (for example, the SIM module 1 or the SIM module 2) into the SIM module interface, the mobile phone detects that the SIM module interface changes from the state of not connecting to the plug-in SIM module to the state of connecting to the plug-in SIM module. In this case, the mobile phone may determine that the status of the SIM module in the mobile phone changes.

The mobile phone obtains card information of the SIM module whose status changes, and checks an activation state of the eSIM module in the mobile phone, so as to perform card setting based on the obtained card information and the activation state of the activated eSIM module in the mobile phone. The card information may include a card type and a card identifier. The card type may be the plug-in SIM module or the eSIM module, and the card identifier may be an ICCID of a SIM module (for example, the plug-in SIM module or the eSIM module).

For example, with reference to FIG. 2, an example in which the user inserts the plug-in SIM module 1 into the SIM module interface 1 is used. After the user inserts the plug-in SIM module 1 into the SIM module interface 1, the mobile phone may determine that the status of the SIM module in the mobile phone changes. The mobile phone obtains a card type and a card identifier of the SIM module whose status changes. For example, if the obtained card type is the plug-in SIM module, an ICCID is an ICCID 1. The ICCID 1 is an ICCID of the plug-in SIM module 1. An example in which the user inserts the plug-in SIM module 2 into the SIM module interface 2 is used. After the user inserts the plug-in SIM module 2 into the SIM module interface 2, the mobile phone may determine that the status of the SIM module in the mobile phone changes. The mobile phone obtains a card type and a card identifier of the SIM module whose status changes. For example, if the obtained card type is the plug-in SIM module, the ICCID is an ICCID 2. The ICCID 2 is an ICCID of the plug-in SIM module 2.

The mobile phone may further check the activation state of the eSIM module in the mobile phone, to determine whether the mobile phone activates the eSIM module.

For example, the mobile phone may determine, based on a quantity of activated eSIM profiles in the mobile phone, whether the mobile phone activates the eSIM module. If the quantity of activated eSIM profiles in the mobile phone is 0, the mobile phone may determine that the mobile phone does not activate the eSIM module. If the quantity of activated eSIM profiles in the mobile phone is not 0, the mobile phone may determine that the mobile phone activates the eSIM module.

In an example, with reference to FIG. 2, it can be learned that, in hardware, the eSIM module (or the eUICC) is connected to the SIM module interface 2. As shown in FIG. 4A, on presentation of the SIM module management interface 401, in response to a tap operation on the control 405, the mobile phone may display the card 2 setting interface 406 shown in FIG. 4B. When the eSIM module shown in FIG. 4B is in an online standby mode and a physical card is inserted into the SIM module interface 2, the following two changes may occur on the card 2 setting interface 406.

Figure 7A:
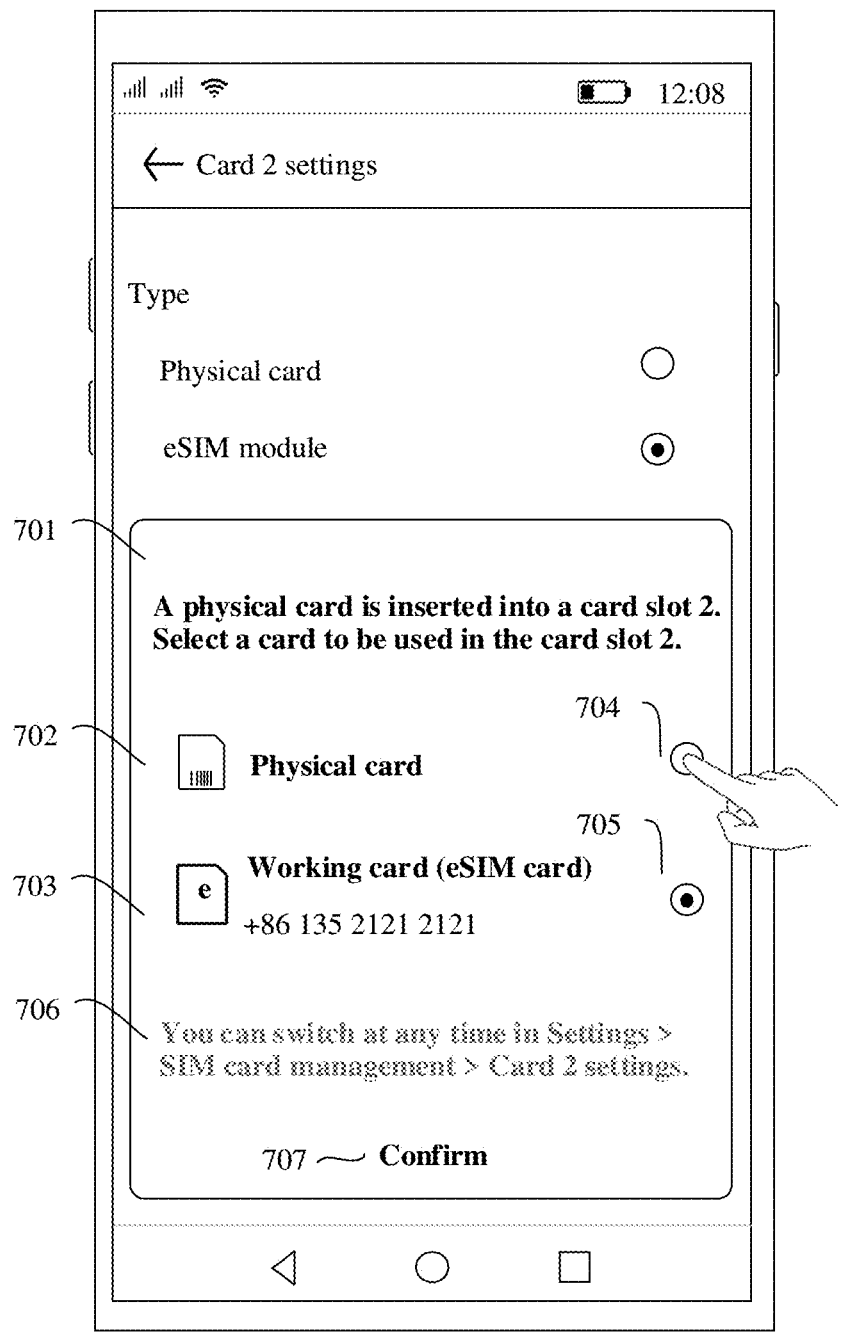
FIG. 7A to FIG. 7E are schematic diagrams of other SIM module management interfaces according to an embodiment of this application.

First change: Refer to FIG. 7A. An interface prompt card 701 appears on the upper part of the card 2 setting interface. In this case, a physical card in a card slot 1 is not removed. The user may perform a tap operation on a button 704 corresponding to an icon "physical card" 702 in the interface prompt card 701, to enable the plug-type SIM module 2, and automatically disable the eSIM module. For example, a display status of a button 705 corresponding to an icon "working card (eSIM card)" 703 shown in FIG. 7A is used to indicate that the eSIM module is currently in an enabled state. If the user wants to disable the eSIM module and enable the plug-type SIM module 2, the user may perform the tap operation on the button 704 corresponding to the icon "physical card" 702. In response to the tap operation on the button 704, a display status of the button 704 changes from a disabled state to an enabled state, and correspondingly, the display state of the button 705 changes from an enabled state to a disabled state. For a selection performed through the tap operation, the user needs to perform a confirmation operation by using an icon "OK" 707. The interface prompt card 701 further includes prompt information shown by an icon "You can switch at any time in Settings>SIM card management>Card 2 settings" 706, to notify the user of a path for switching the card 2 in a setting application.

Figure 7B:
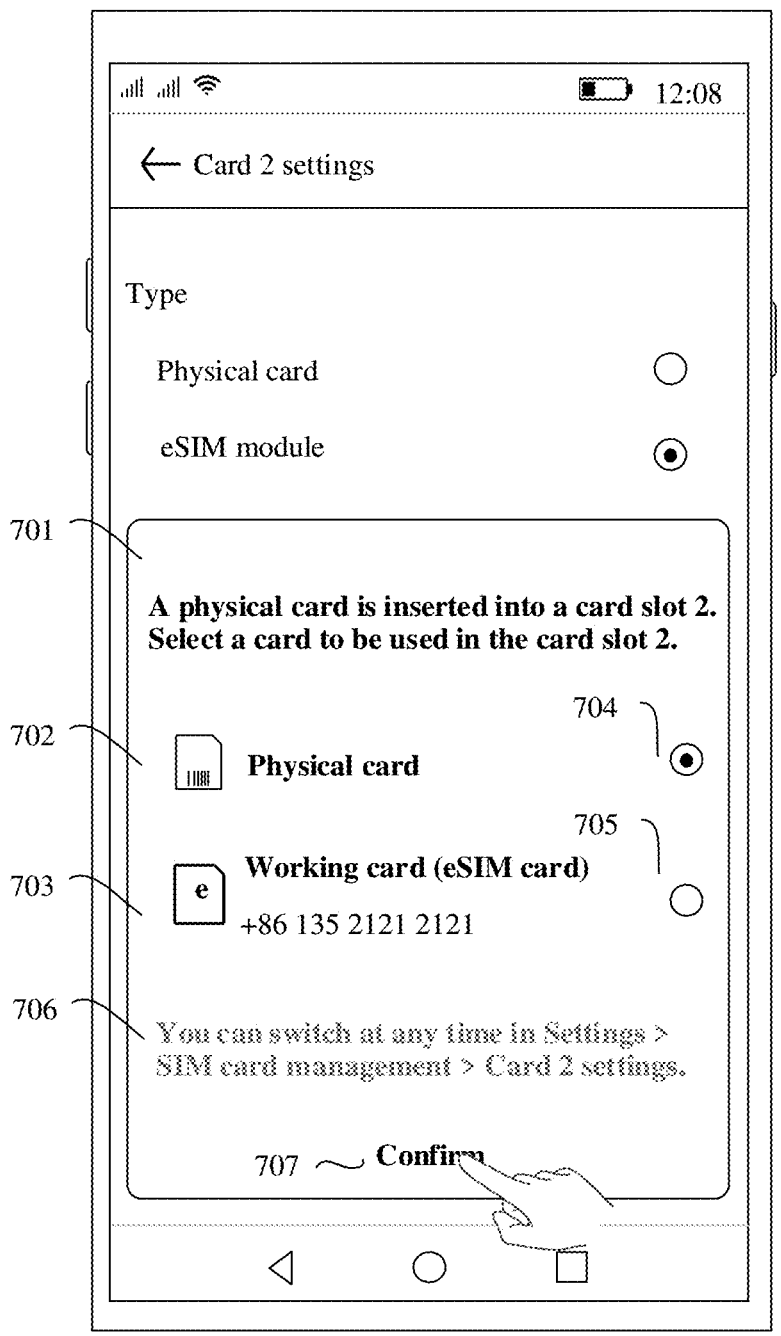
Figure 7C:
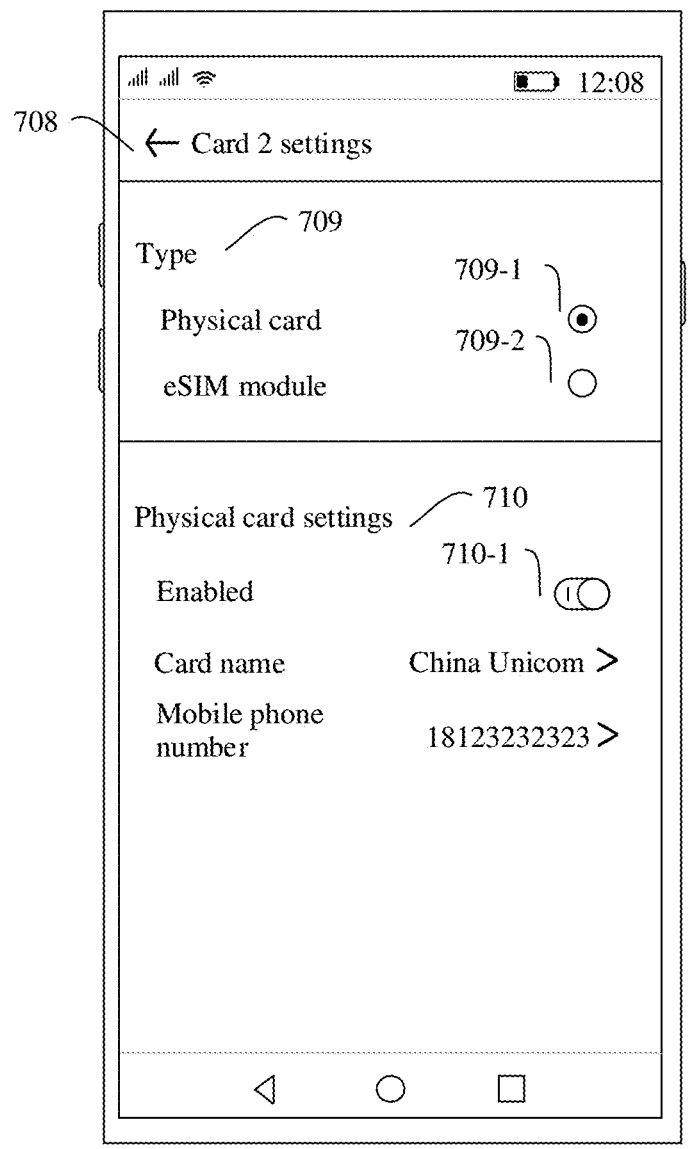

For example, in response to the tap operation performed by the user on the button 704, the interface prompt card 701 displays an interface shown in FIG. 7B. The user may perform a confirmation operation by taping the icon "OK" 707 in the interface prompt card 701, to confirm that the plug-in SIM module 2 needs to be enabled, and the eSIM module needs to be automatically disabled. In response to a tap operation performed by the user on the icon "OK" 707, the interface prompt card 701 disappears, and a card 2 setting interface 708 shown in FIG. 7C is displayed again. The card 2 setting interface 708 includes a "type" option 709. The user may use the "type" option 709 to select one of the SIM module 2 and the eSIM module to be in an online standby mode. For example, the user may select, by selecting a button 709-1 or a button 709-2, one of the plug-in SIM module 2 and the eSIM module to be in an online standby mode. For example, with reference to FIG. 7B, in response to the tap operation performed by the user on the icon "OK" 707, based on a user selection, the mobile phone controls the SIM module interface 2 to be connected to a modem through cooperation of the SCI 1 and the SCI, so that the plug-in SIM module 2 inserted into the SIM module interface 2 is in an online standby mode. For another example, with reference to FIG. 7B, before tapping the icon "OK" 707, if the user taps the button 705 corresponding to the icon "working card (eSIM card)" 703 again, and performs a confirmation operation on the icon "OK" 707, based on the user selection, the mobile phone controls the eSIM module to be connected to the modem through cooperation of the SCI 1 and the SCI, so that the eSIM module continues to be in an online standby mode. Then, the mobile phone may display the card 2 setting interface 406 shown in FIG. 4B.

Figure 7D:
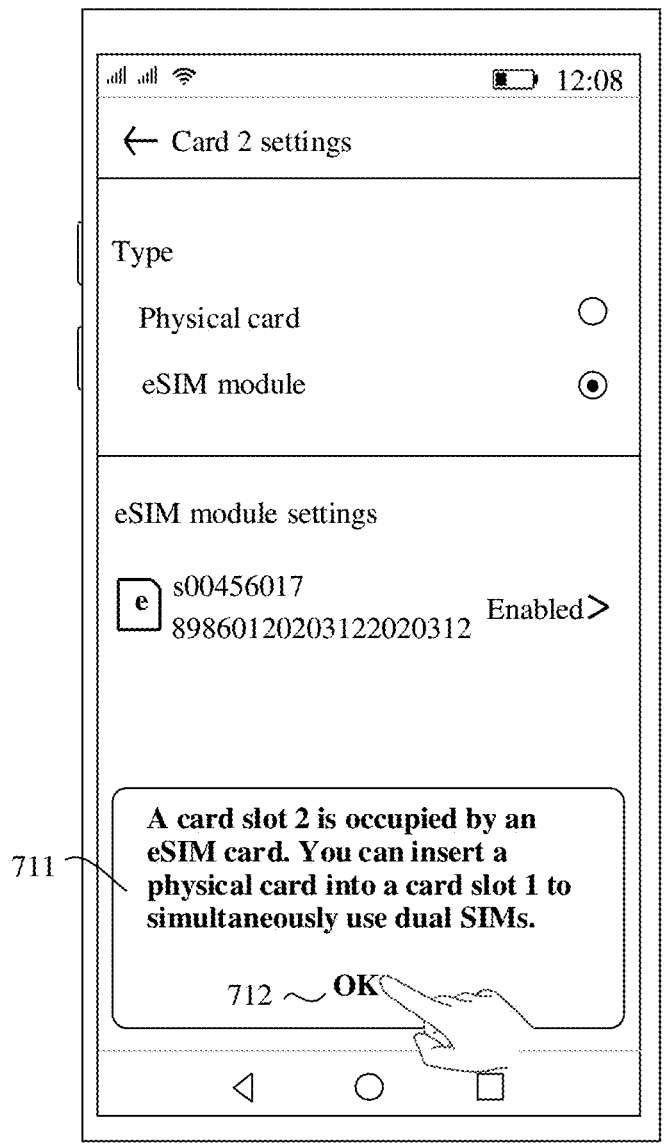
Figure 7E:
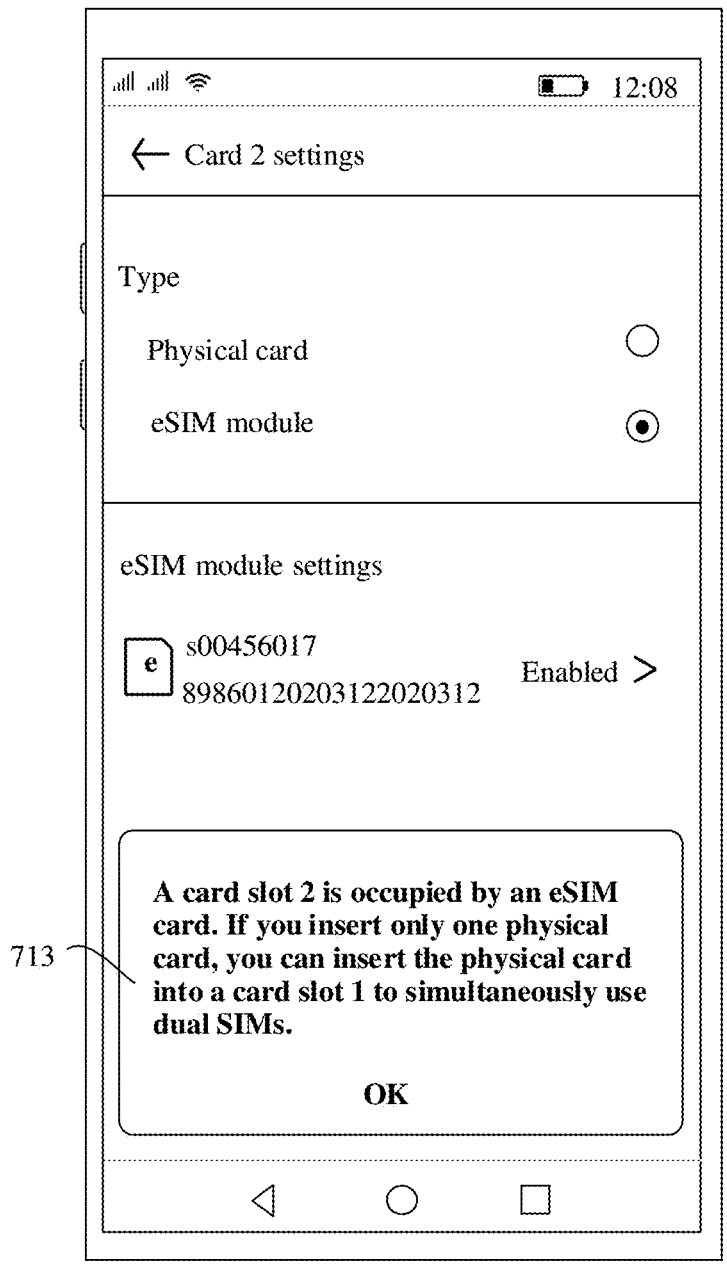

Second change: Refer to FIG. 7D. An interface prompt card 711 appears on the upper part of the card 2 setting interface. For example, when inserting the physical card into the SIM module interface 2, the user removes the physical card from the card slot 1. For another example, when there is no physical card in the card slot 1 and the user inserts the physical card into the SIM module interface 2, the interface prompt card 711 may be displayed. The card 711 displays prompt information indicating that "A card slot 2 is occupied by an eSIM card. You can insert a physical card into a card slot 1, to simultaneously use dual SIMs." The user may perform a tap operation on an icon "OK" 712 in the interface prompt card 711, to confirm and learn the information. In an embodiment, when the eSIM module is in an online standby mode and a card tray is removed, the mobile phone determines that the user may insert a physical card, and may present the foregoing interface prompt card 713. Refer to FIG. 7E. Prompt content on the card can be "A card slot 2 is occupied by an eSIM card. If you insert only one physical card, you can insert the physical card into a card slot 1, to simultaneously use dual SIMs." In this way, an advantageous effect of giving an interface prompt to the user in advance is avoiding a complex operation that after inserting the only physical card into the card slot 2, the user still needs to remove the card tray again to insert the physical card into the card slot 1.

One of ordinary skilled in the art may understand that when the eSIM module is in position, the interface prompt cards 701 and 711 may be displayed on a user interface, including the card 2 setting interface shown in FIG. 4B, the SIM module management interface 401 shown in FIG. 4A, and another mobile phone user interface.

Figure 8:
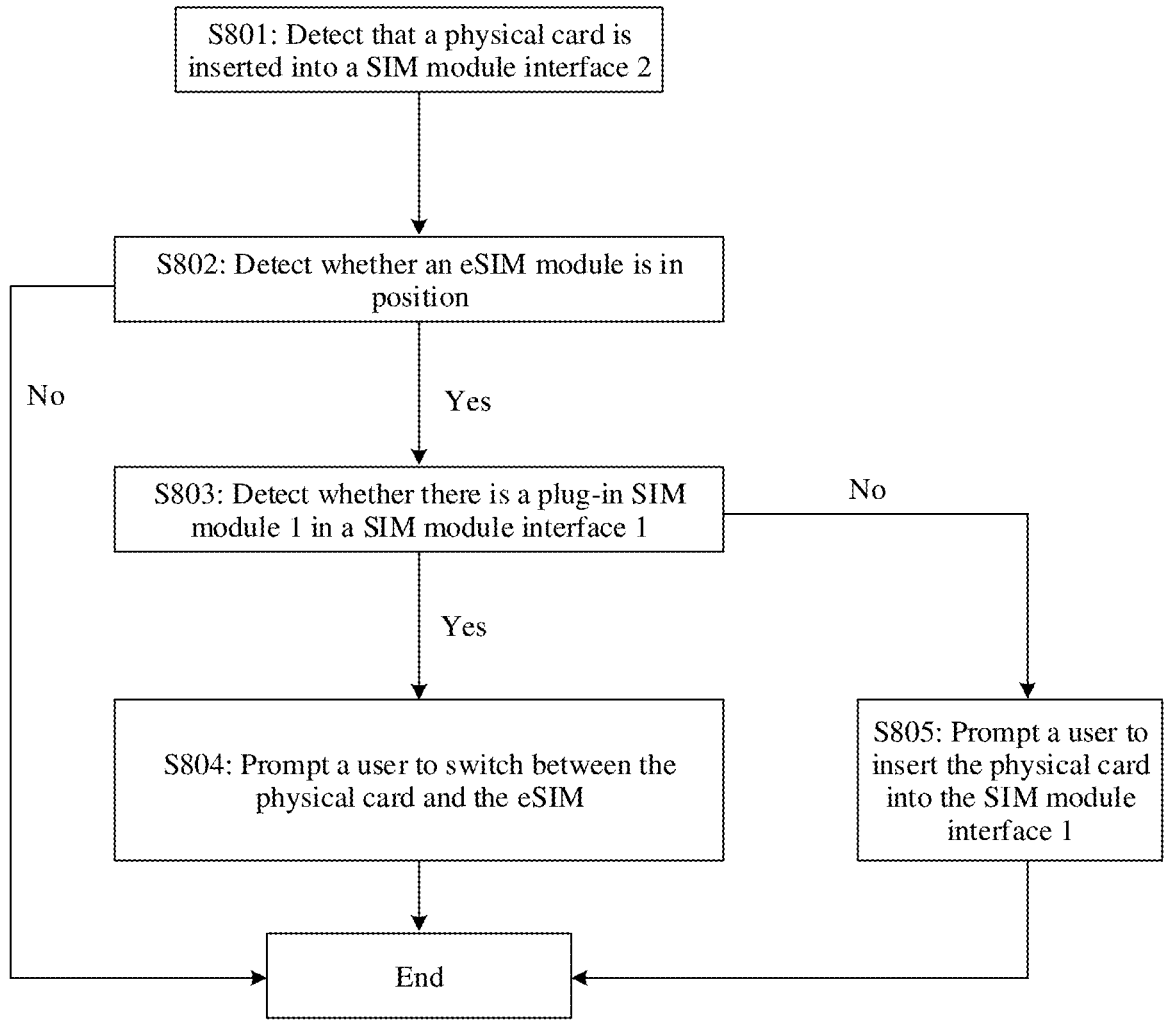
FIG. 8 is a schematic flowchart of a SIM module management method according to an embodiment of this application.

FIG. 8 shows a SIM card management flowchart corresponding to the preceding two changes.

S801: Detect that the physical card (namely, the plug-in SIM module 2) is inserted into the SIM module interface 2.

After the user inserts the plug-in SIM module 2 into the SIM module interface 2, the mobile phone may determine that the status of the SIM module in the mobile phone changes. The mobile phone obtains the card type and the card identifier of the SIM module whose status changes. For example, if the obtained card type is the plug-in SIM module, the ICCID is an ICCID 2. The ICCID 2 is the ICCID of the plug-in SIM module 2.

S802: Detect whether the eSIM module is in position.

The mobile phone checks an in-position state of the eSIM module. The in-position state of the eSIM module means that, in hardware, the SCI is connected to the eUICC, and the eSIM module may not be activated or enabled. If it is detected that, in hardware, the SIM module interface 2 is connected to the eSIM module, it indicates that the SIM module interface 2 is occupied by the eSIM module, and operation S803 continues to be performed. With reference to FIG. 2, it can be learned that, in hardware, the eSIM module (or the eUICC) is connected to the SIM module interface 2. That the eSIM module is in position means that the eSIM module is connected to the SCI 1 through the SIM module interface 2 and powered on. On a user interface of the mobile phone, for example, on the SIM module management interface 401 shown in FIG. 4A, the icon "card 2" 403 corresponding to the eSIM module and the plug-in SIM module 2 inserted into the SIM interface 2 includes a word "eSIM card". The user may learn that the eSIM module is currently selected to be in an online standby mode. For another example, on the card 2 setting interface 406 shown in FIG. 4B, the button 407-2 corresponding to the eSIM module is in a selected state. If it is detected that the SIM module interface 2 is not connected to the eSIM module, for example, the plug-in SIM module 2 is connected the SCI 1 through the SIM module interface 2 and powered on, the operation ends.

S803: Detect whether there is the plug-in SIM module 1 in the SIM module interface 1.

The mobile phone checks the SIM module interface 1 to determine whether there is the plug-in SIM module 1. If there is the plug-in SIM module 1, there is a physical card in the card slot 1 of the mobile phone, and operation S804 continues to be performed. On the contrary, if there is no plug-in SIM module 1, there is no physical card in the card slot 1 of the mobile phone, and operation S805 is performed next.

S804: Prompt the user to switch between the physical card and the eSIM.

This operation is presented on a user interface as shown in FIG. 7A. When there is a physical card in the card slot 1 of the mobile phone, the user can be prompted to insert a new physical card into the card slot 2 and the user can select a card to be used in the card slot 2. The foregoing interface prompt is not limited to the card 701 that can interact with the user and that is shown in FIG. 7A, and further includes an interface prompt manner such as a pop-up window or a notification. The user may perform tap operations on the button 704 and the button 705 in the interface prompt card, to select to use the physical card or the eSIM card in the card 2. When the user selects the physical card, after the physical card is inserted, the user can directly switch the eSIM card to the physical card as prompted. This facilitates the user to change the physical card.

S805: Prompt the user to insert the physical card into the SIM module interface 1.

This operation is presented on a user interface as shown in FIG. 7D. When there is no physical card in the card slot 1 of the mobile phone, the user can be prompted that the physical card can be inserted into the card slot 1, so as to simultaneously use dual SIMs. The foregoing interface prompt is not limited to the card 711 that can interact with the user and that is shown in FIG. 7D, and further includes an interface prompt manner such as a pop-up window or a notification. The user can follow the interface prompt to insert the physical card into the empty card slot 1, so that the physical card and the eSIM card can be used at the same time.

In another example, with reference to FIG. 3, it can be learned that hardware of the electronic device further includes the SCI 2, so that the eSIM module (or the eUICC) may be connected to both the SIM module interface 1 and the SIM module interface 2. The SCI 2, the SCI 1, and the SCI cooperate to control connection relationships between different modems and different SIM module interfaces or different eSIM modules. In this way, the plug-in SIM module 1, and the eSIM module or the plug-in SIM module 2 may implement a dual-standby function. In addition, the plug-in SIM module 2, and the eSIM module or the plug-in SIM module 1 may further implement the dual-standby function.

Figure 9A:
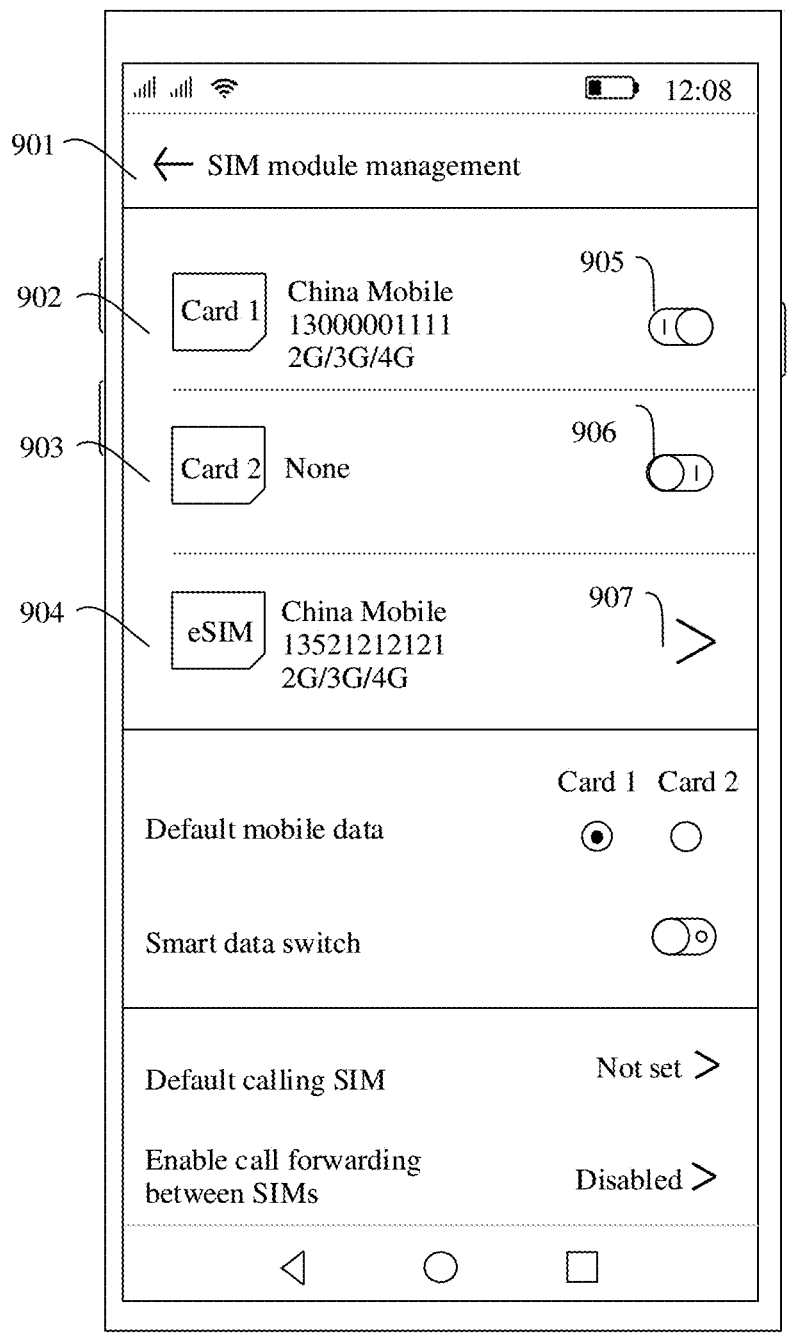
FIG. 9A to FIG. 9G are schematic diagrams of still other SIM module management interfaces according to an embodiment of this application.

On presentation of a SIM module management interface, for example, a SIM module management interface 901 shown in FIG. 9A, an icon "card 1" 902 corresponds to the plug-in SIM module 1 inserted into the SIM interface 1, and a control, for example, a button 905, corresponding to the icon "card 1" 902 may be configured to set the plug-in SIM module 1. An icon "card 2" 903 corresponds to the plug-in SIM module 2 inserted into the SIM interface 2, and a control, for example, a control 906, corresponding to the icon "card 2" 903 may be configured to set the plug-in SIM module 2. An icon "eSIM" 904 corresponds to the eSIM module, and a control, for example, a control 907, corresponding to the icon "eSIM" 904 may be configured to set the eSIM module. In a case in which a physical card is inserted into the card slot 1 shown in FIG. 9A, no card is inserted into the card slot 2, and the eSIM module is activated, if a physical card is inserted into the SIM module interface 2, the following three changes may occur on the SIM module management interface 901.

Figure 9B:
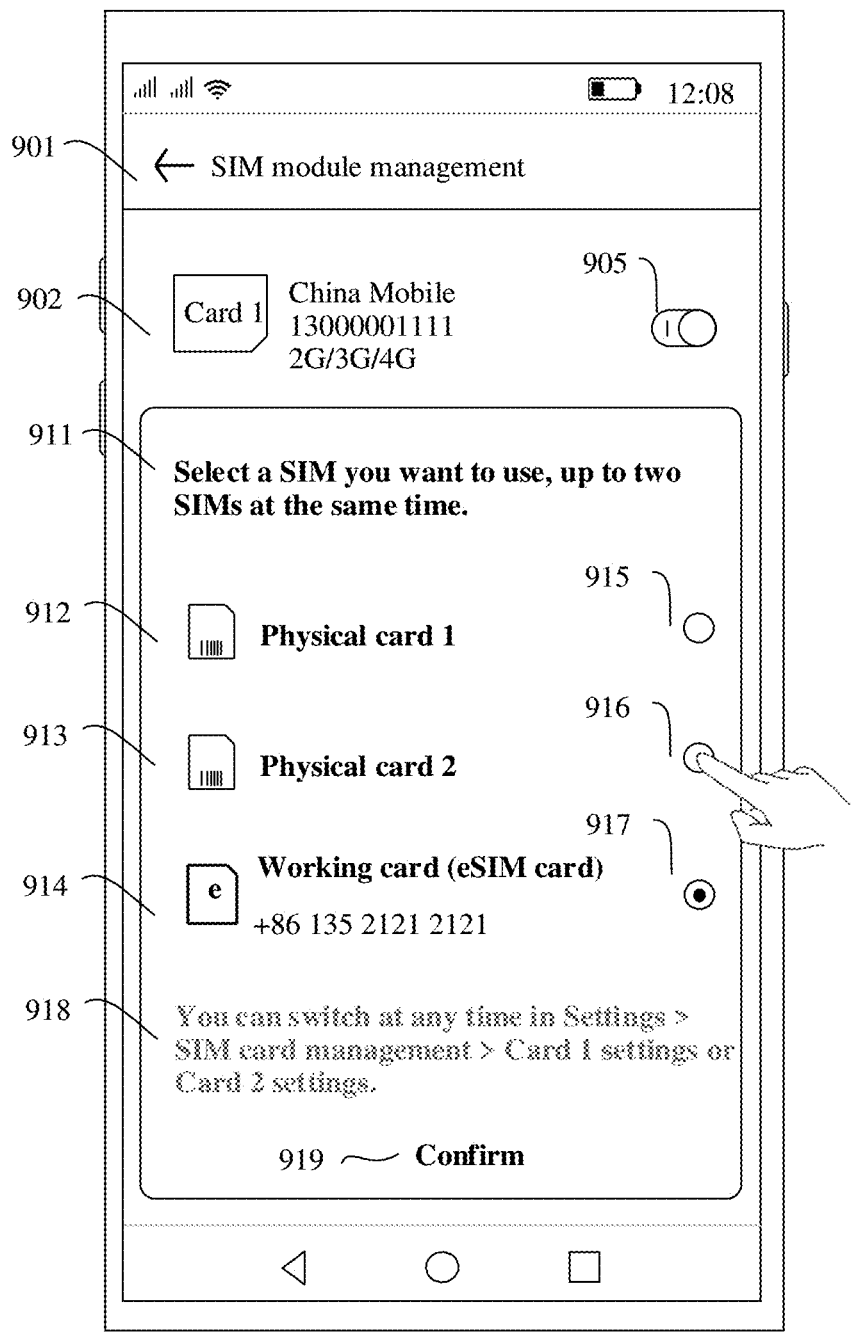

First change: When one physical card is inserted into the card slot 1, as shown in FIG. 9B, an interface prompt card 911 appears on the upper part of the SIM module management interface 901, prompting the user to "Select a desired SIM, and use a maximum of two SIMs at the same time". The user may perform a tap operation on a button 915 corresponding to an icon "physical card 1" 912 in the interface prompt card 911, to enable the plug-in SIM module 1. Alternatively, the user may perform a tap operation on a button 916 corresponding to an icon "physical card 2" 913 in the interface prompt card 911, to enable the plug-in SIM module 2. Similarly, the user may perform a tap operation on a button 917 corresponding to an icon "working card (eSIM card)" 914 in the interface prompt card 911, to disable or enable the eSIM module. For a selection performed through the tap operation, the user needs to perform a confirmation operation by using an icon "OK" 919. The interface prompt card 911 further includes prompt information shown by an icon "You can switch at any time in Settings>SIM card management settings" 918, to notify the user of a path for switching a SIM card in a setting application.

Figure 9C:
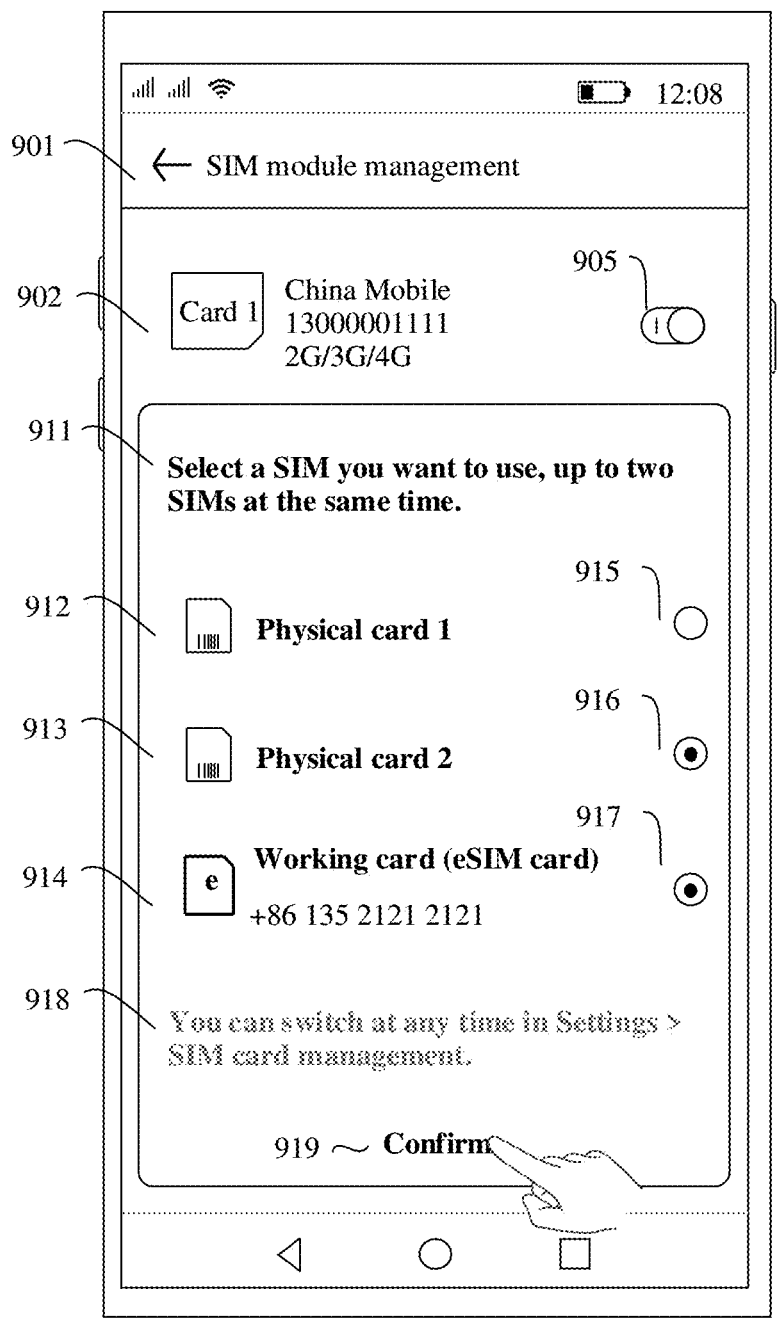
Figure 9D:
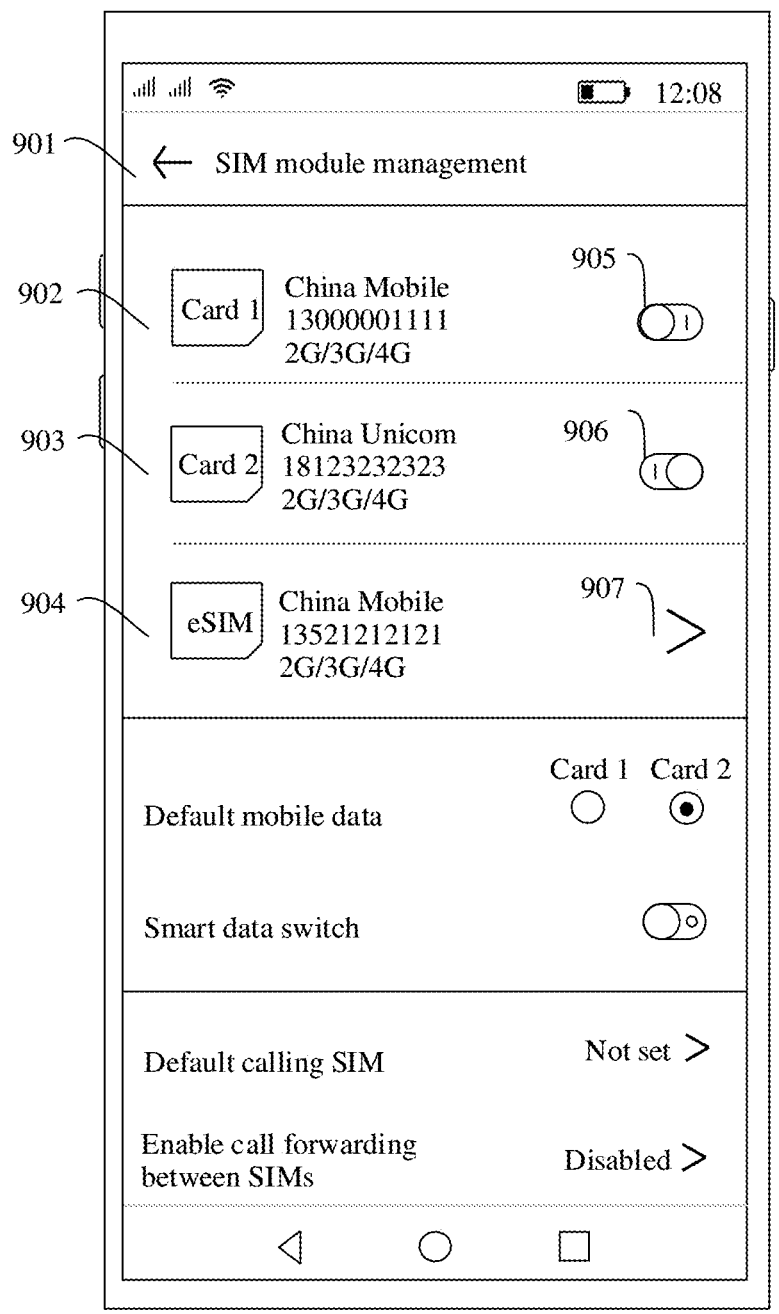

For example, in response to the tap operation performed by the user on the button 916 and the button 917, the interface prompt card 911 displays an interface shown in FIG. 9C. The user may perform a confirmation operation by taping the icon "OK" 919 in the interface prompt card 901, to confirm that the plug-in SIM module 2 and the eSIM module need to be enabled, and the plug-in SIM module 1 needs to be automatically disabled. In response to the tap operation performed by the user on the icon "OK" 919, the interface prompt card 911 disappears, and the SIM module management interface 901 shown in FIG. 9D is displayed again. The button 905 corresponding to the icon "card 1" 902 is automatically disabled, that is, the plug-in SIM module 1 is automatically disabled. Information on a physical card corresponding to the icon "card 2" 903 is automatically displayed, and a button 906 corresponding to the icon "card 2" 903 is automatically enabled, that is, the plug-in SIM module 2 is automatically enabled. The icon "eSIM" 904 and the control 907 corresponding to the icon "eSIM" 904 remain unchanged. The preceding display status indicates that the physical card in the card slot 1 is disabled, the physical card in the card slot 2 is enabled, and the eSIM card is enabled. For example, with reference to FIG. 9B, in response to the tap operation performed by the user on the icon "OK" 909, based on a user selection, the mobile phone controls the SIM module interface 2 to be connected to a modem through cooperation of the SCI 1 and the SCI, and controls the eSIM module to be connected to the modem through cooperation of the SCI 2 and the SCI, so that the plug-in SIM module 2 and the eSIM module are in an online standby mode.

In an embodiment, before tapping the icon "OK" 919 shown in FIG. 9B, the user may alternatively select the physical card 1 and the physical card 2, or continue to use the physical card 1 and a working card. In response to the confirmation operation performed by the user on the icon "OK" 919, based on the user selection, the mobile phone controls the selected SIM module to be connected to the modem through cooperation of the SCI 1, the SCI 2, and the SCI.

Figure 9E:
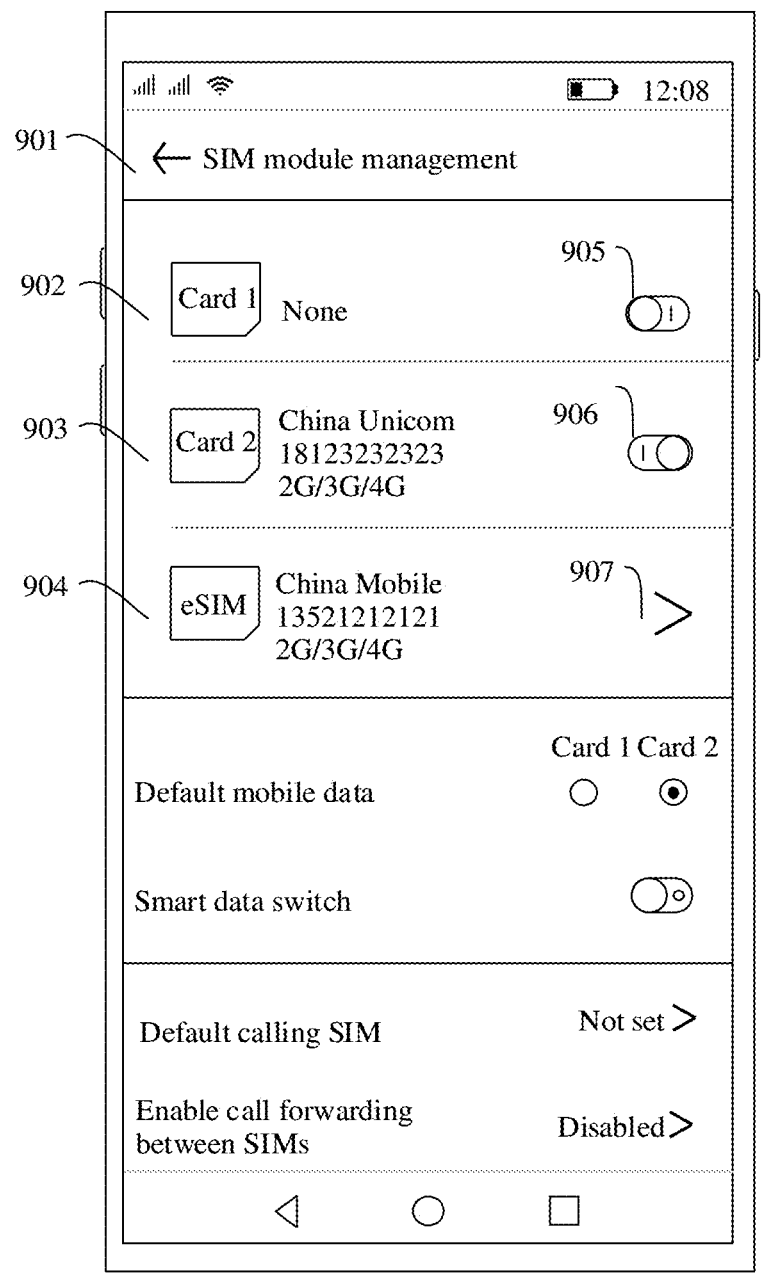

Second change: Refer to FIG. 9E. In the SIM module management interface 901, information on the plug-in SIM module 1 in the icon "card 1" 902 disappears, and the button 905 corresponding to the icon "card 1" 902 is disabled. This is because, when the eSIM module shown in FIG. 9A is in an online standby mode and the user inserts a physical card into the SIM module interface 2, the user removes the physical card from the card slot 1. With reference to FIG. 3, based on a user selection, the mobile phone controls the SIM module interface 2 to be connected to a modem through cooperation of the SCI 1 and the SCI, and controls the eSIM module to be connected to the modem through cooperation of the SCI 2 and the SCI, so that the plug-in SIM module 2 and the eSIM module are in an online standby mode. In this case, the SIM module interface 1 is disconnected from the SCI 2. In addition, the icon "card 2" 903 displays information corresponding to the plug-in SIM module 2 inserted into the SIM module interface 2, and the button 906 corresponding to the icon "card 2" 903 is automatically enabled. Information on an eSIM module corresponding to the icon "eSIM" 904 and the control 907 remain unchanged.

Figure 9F:
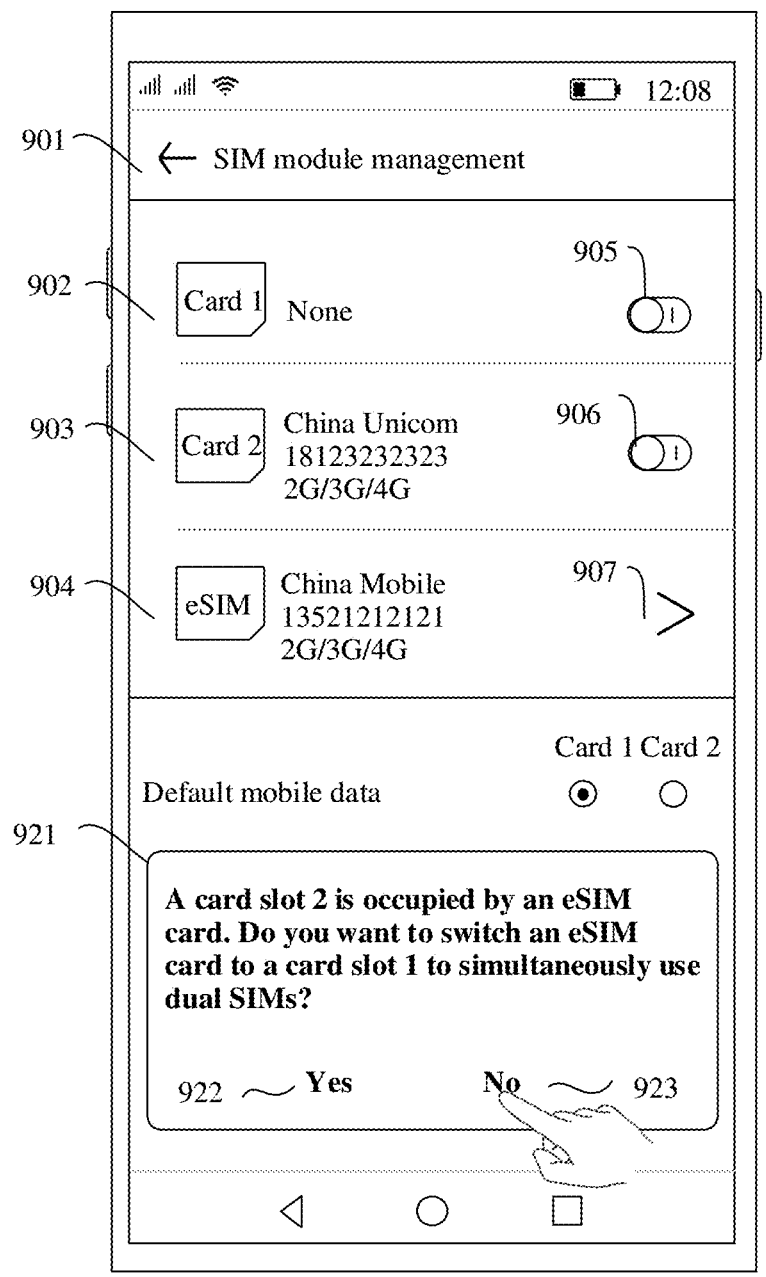
Figure 9G:
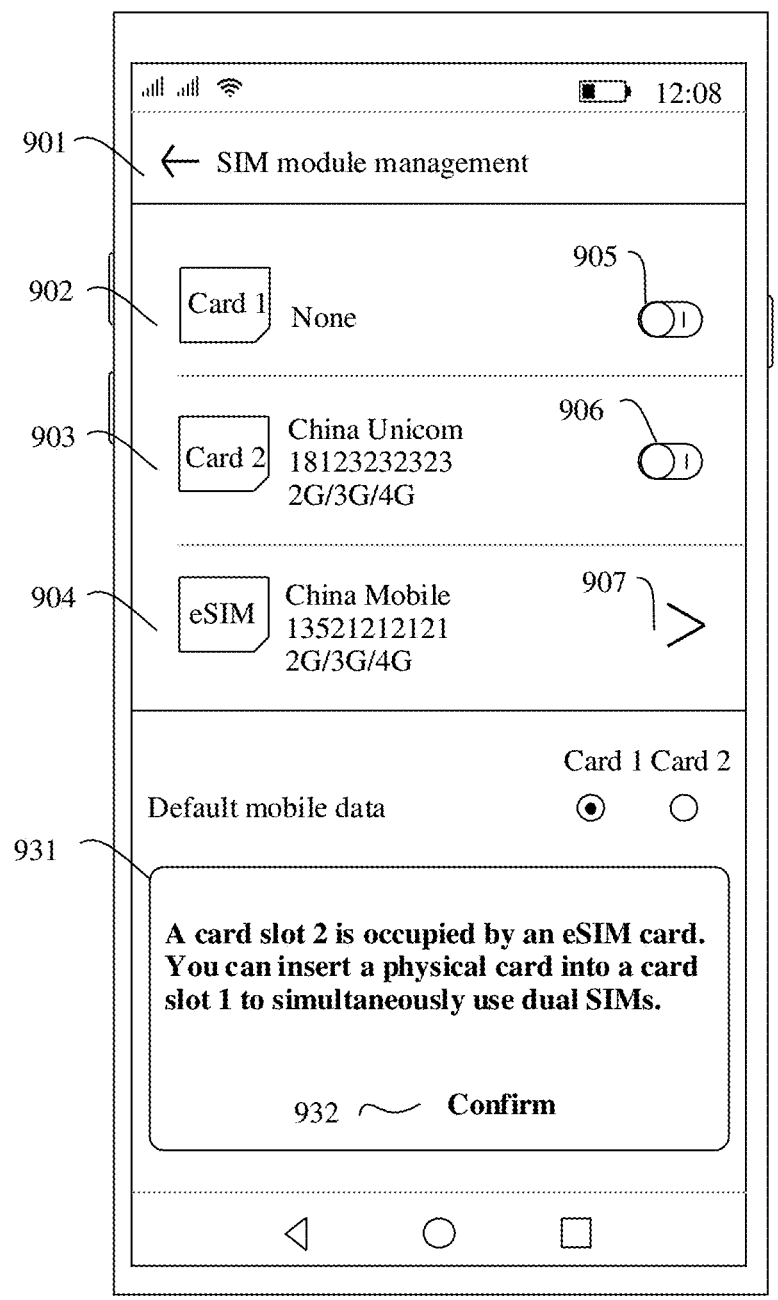

Third change: Refer to FIG. 9F. An interface prompt card 921 appears on the upper part of the SIM module management interface 901, to prompt the user that "A card slot 2 is occupied by an eSIM card. Do you want to switch an eSIM card to a card slot 1 to simultaneously use dual SIMs?" For example, when the eSIM module shown in FIG. 9A is in an online standby mode and the user inserts a physical card into the SIM module interface 2, the user removes the physical card from the card slot 1. To help the user observe automatic switching of the SIM module by the mobile phone, prompt information is provided on a user interface before automatic switching. For another example, when there is no physical card in the card slot 1 and the user inserts the physical card into the SIM module interface 2, the interface prompt card 921 may be displayed. The user may select, by taping "Yes" for a control 922 and "No" for a control 923 in the interface prompt card 921, whether a card slot connected to the eSIM module needs to be switched. If the user taps "Yes" for the control 922, the interface prompt card 921 disappears, and the SIM module management interface 901 displays an interface obtained after connection switching of the eSIM module shown in FIG. 9E. On the contrary, if the user performs a tap operation on the control 923, as shown in FIG. 9G, an interface prompt card 931 appears on the upper part of the SIM module management interface 901, to prompt the user that "A card slot 2 is occupied by an eSIM card. You can insert a physical card into a card slot 1, to simultaneously use dual SIMs." The user may perform an operation "OK" on the control 932 in the interface prompt card 931, to confirm and learn the information.

Figure 10:
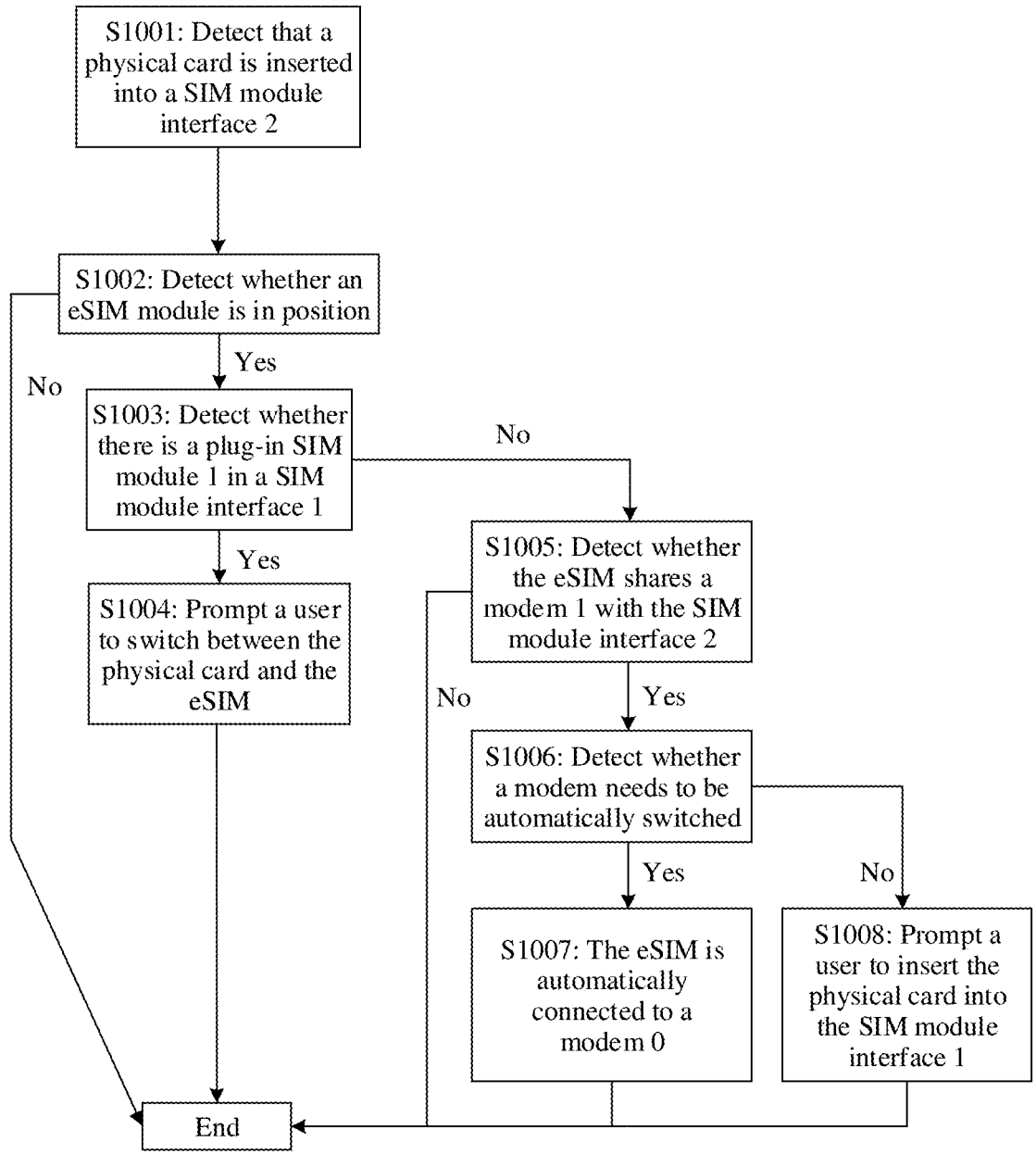
FIG. 10 is a schematic flowchart of another SIM module management method according to an embodiment of this application.

FIG. 10 shows a SIM card management flowchart corresponding to the preceding three changes.

S1001: Detect that the physical card (namely, the plug-in SIM module 2) is inserted into the SIM module interface 2.

After the user inserts the plug-in SIM module 2 into the SIM module interface 2, the mobile phone may determine that a status of the SIM module in the mobile phone changes. The mobile phone obtains a card type and a card identifier of the SIM module whose status changes. For example, if the obtained card type is the plug-in SIM module, the ICCID is an ICCID 2. The ICCID 2 is an ICCID of the plug-in SIM module 2.

S1002: Detect whether the eSIM module is in position.

The mobile phone checks an in-position state of the eSIM module. If it is detected that, in hardware, the SIM module interface 2 is connected to the eSIM module, it indicates that the SIM module interface 2 is occupied by the eSIM module, and operation S1003 continues to be performed. With reference to FIG. 3, it can be learned that, in hardware, the eSIM module (or the eUICC) may be connected to the SIM module interface 1, or may be connected to the SIM module interface 2. That the eSIM module is in position means that the eSIM module is connected to the SCI 2 through the SIM module interface 1 and powered on, or the eSIM module is connected to the SCI 1 through the SIM module interface 2 and powered on. On a user interface of the mobile phone, for example, on the SIM module management interface 901 shown in FIG. 9A, the icon "eSIM" 904 corresponding to the eSIM module shows a carrier, a number, and a network capability, and the user may learn that the eSIM module is currently in an online standby mode. If it is detected that neither of the SIM module interface 2 and the SIM module interface 1 is connected to the eSIM module, for example, the plug-in SIM module 2 is connected to the SCI 1 through the SIM module interface 2 and powered on, and the plug-in SIM module 1 is connected to the SCI 2 through the SIM module interface 1 and powered on, the operation ends.

S1003: Detect whether there is the plug-in SIM module 1 in the SIM module interface 1.

The mobile phone checks the SIM module interface 1 to determine whether there is the plug-in SIM module 1. If there is the plug-in SIM module 1, there is a physical card in the card slot 1 of the mobile phone, and operation S1004 continues to be performed. On the contrary, if there is no plug-in SIM module 1, there is no physical card in the card slot 1 of the mobile phone, and operation S1005 is performed next.

S1004: Prompt the user to switch between the physical card and the eSIM.

This operation is presented on a user interface as shown in FIG. 9B. When there are physical cards in the card slot 1 and the card slot 2 of the mobile phone, the user can be prompted to select two to-be-used cards from two physical cards and one eSIM card. The foregoing interface prompt is not limited to the card 901 that can interact with the user and that is shown in FIG. 9B, and further includes an interface prompt manner such as a pop-up window or a notification. The user may perform a tap operation on the button 915, the button 916, and the button 917 in the interface prompt card, to select to use two physical cards or one physical card and one eSIM card. Compared with a hardware structure shown in FIG. 2, a hardware structure shown in FIG. 3 can support simultaneous use of the SIM card 1 and the SIM card 2, and simultaneous use of the SIM card 1 and the eSIM card, and simultaneous use of the SIM card 2 and the eSIM card, and the user does not need to change a card slot.

S1005: Detect whether the eSIM shares a modem 1 with the SIM module interface 2.

With reference to FIG. 3, it can be learned that, in hardware, the eSIM module (or the eUICC) may be connected to the SIM module interface 1, or may be connected to the SIM module interface 2. If the eSIM module is connected to the SIM module interface 2, that is, the eSIM module shares the modem 1 with the SIM module interface 2, operation S1006 or S1007 may continue to be performed. If the eSIM module is connected to the SIM module interface 1, and the eSIM module and the plug-in SIM module 2 are respectively connected to a modem 0 and the modem 1, the operation ends.

S1006: Detect whether a modem needs to be automatically switched.

This operation is presented on a user interface as shown in FIG. 9F. When there is no physical card in the card slot 1 of the mobile phone but there is a physical card in the card slot 2, the user can be prompted that the card slot 2 is currently occupied by the eSIM card, and the mobile phone may switch the eSIM to the card slot 1, to simultaneously use dual SIMs. The foregoing interface prompt is not limited to the card 921 that can interact with the user and that is shown in FIG. 9F, and further includes an interface prompt manner such as a pop-up window or a notification. The user may perform a tap operation on a button 922 and a button 923 in the interface prompt card, to select the mobile phone to automatically switch the eSIM card slot or manually switch the eSIM card slot.

S1007: The eSIM is automatically connected to the modem 0.

Based on a user selection for automatically switching the eSIM card slot, the mobile phone switches, through cooperation of the SCI 2 and the SCI, the eSIM module originally connected to the SIM module interface 2 through cooperation of the SCI 1 and the SCI, to be connected to the SIM module interface 1, so that the eSIM module shares the modem 0 with the SIM module interface 1. In this case, there is no physical card in the card slot 1, and there is a physical card in the card slot 2. The eSIM card and the physical card in the card slot 2 can be simultaneously used, without a need for the user to manually switch a card slot.

S1008: Prompt the user that the physical card may be inserted into the SIM module interface 1.

This operation is presented on a user interface as shown in FIG. 9G. When there is no physical card in the card slot 1 of the mobile phone, the user can be prompted that the physical card can be inserted into the card slot 1, so as to simultaneously use dual SIMs. The foregoing interface prompt is not limited to the card 9311 that can interact with the user and that is shown in FIG. 9G, and further includes an interface prompt manner such as a pop-up window or a notification. The user can follow the interface prompt to insert the physical card into the empty card slot 1, so that the physical card and the eSIM card can be used at the same time.

In some embodiments, with reference to FIG. 3, it can be learned that hardware of the electronic device further includes the SCI 2, so that the eSIM module (or the eUICC) may be connected to both the SIM module interface 1 and the SIM module interface 2. The SCI 2, the SCI 1, and the SCI cooperate to control connection relationships between different modems and different SIM module interfaces or different eSIM modules. In this way, the plug-in SIM module 1, and the eSIM module or the plug-in SIM module 2 may implement a dual-standby function. In addition, the plug-in SIM module 2, and the eSIM module or the plug-in SIM module 1 may further implement the dual-standby function. If the user has not added a new eSIM module to the mobile phone, when adding the new eSIM module, the user may be prompted to download the new eSIM module to one interface that is of the SIM module interface 1 and the SIM module interface 2 and that is not connected to the plug-in SIM module.

Figure 11A:
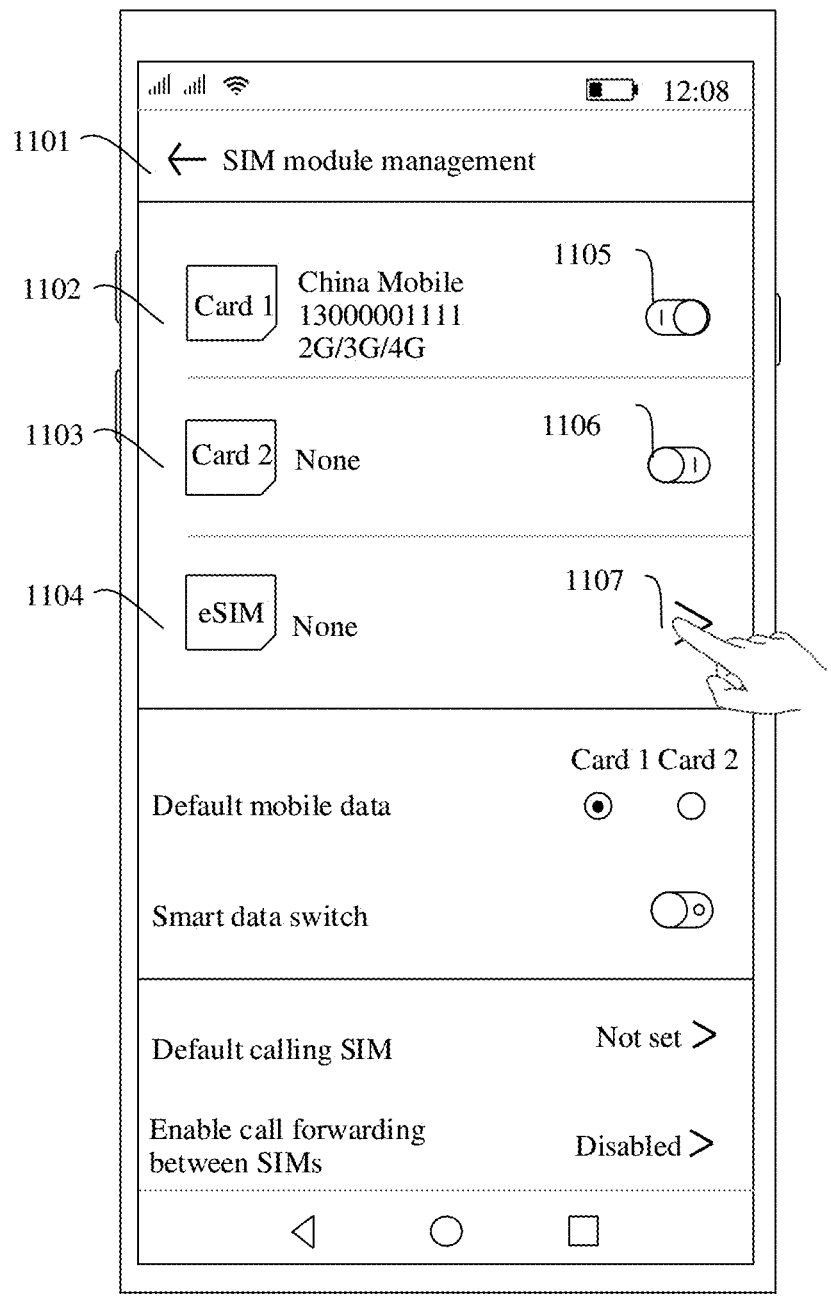
FIG. 11A to FIG. 11I are schematic diagrams of yet other SIM module management interfaces according to an embodiment of this application.
Figure 11B:
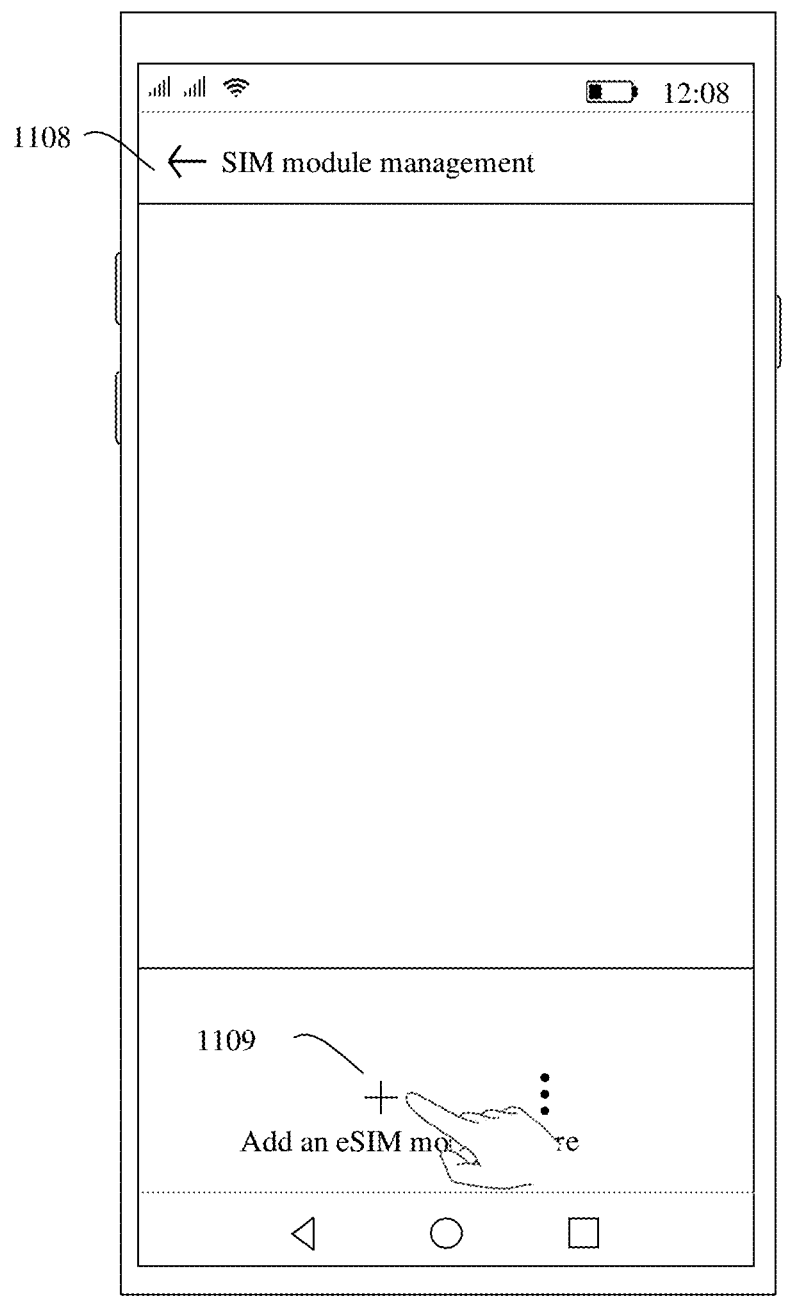
Figure 11D:
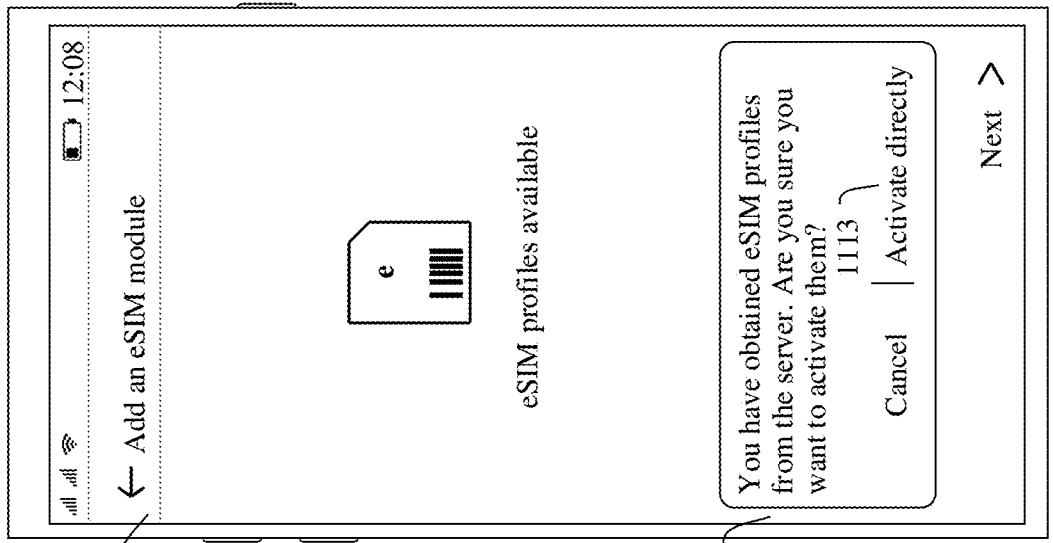
Figure 11C:
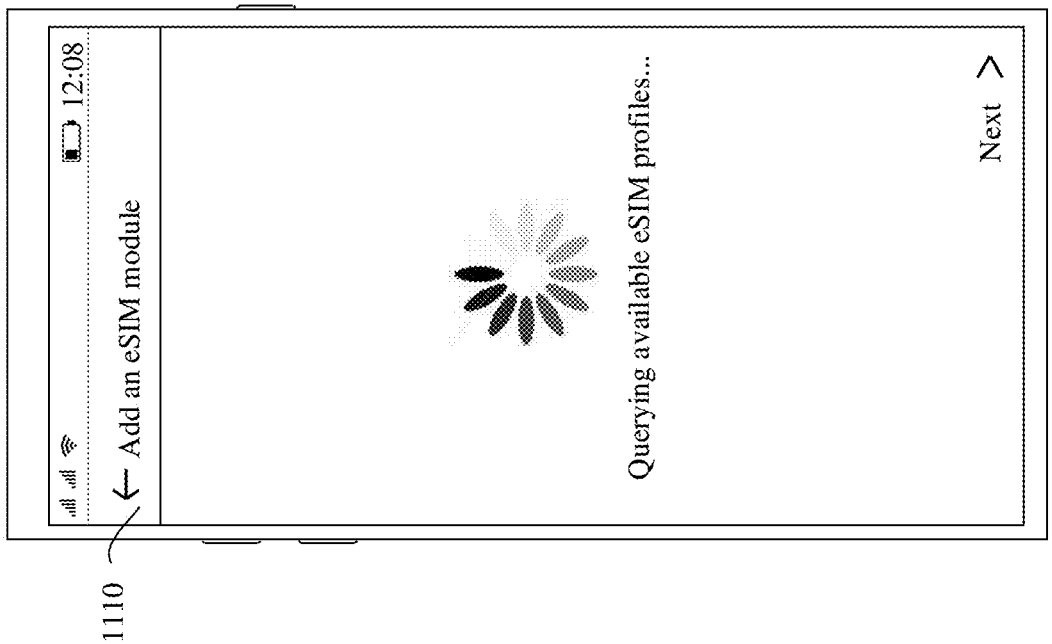
Figure 11F:
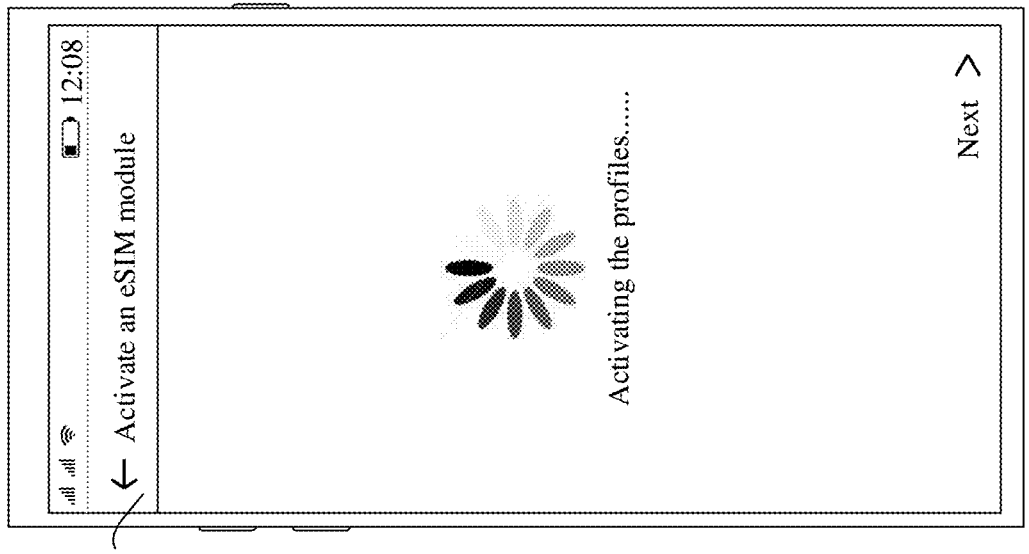
Figure 11E:
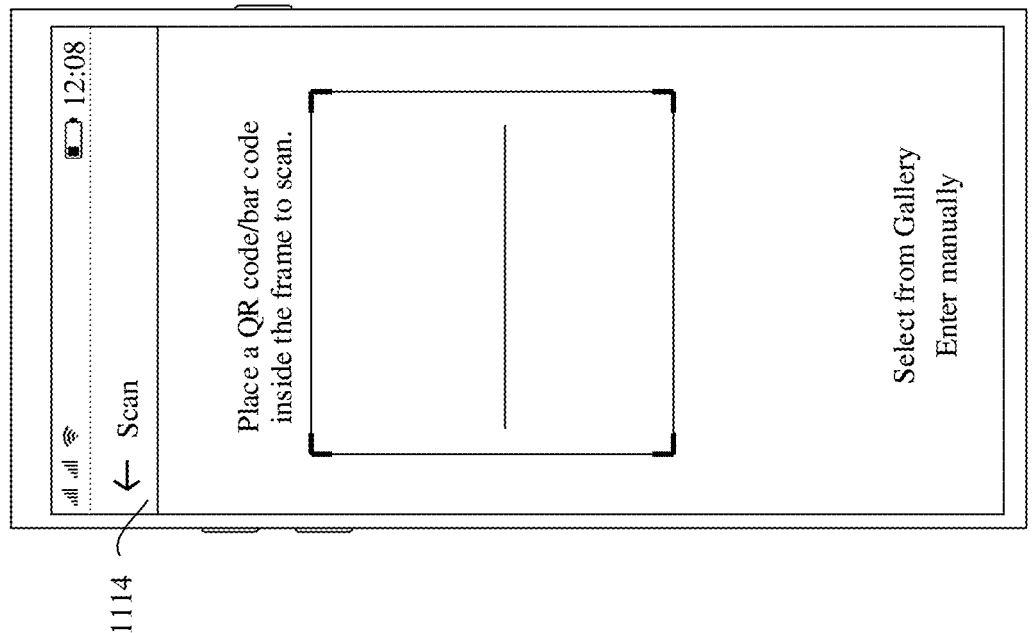
Figure 11H:
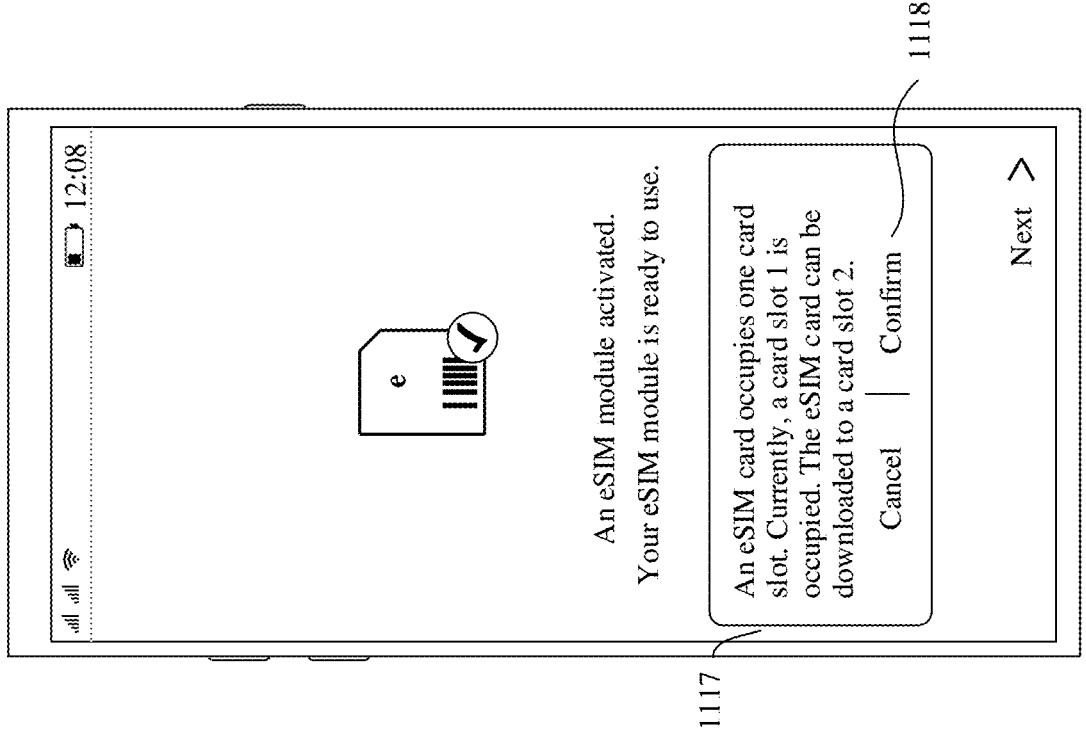
Figure 11G:
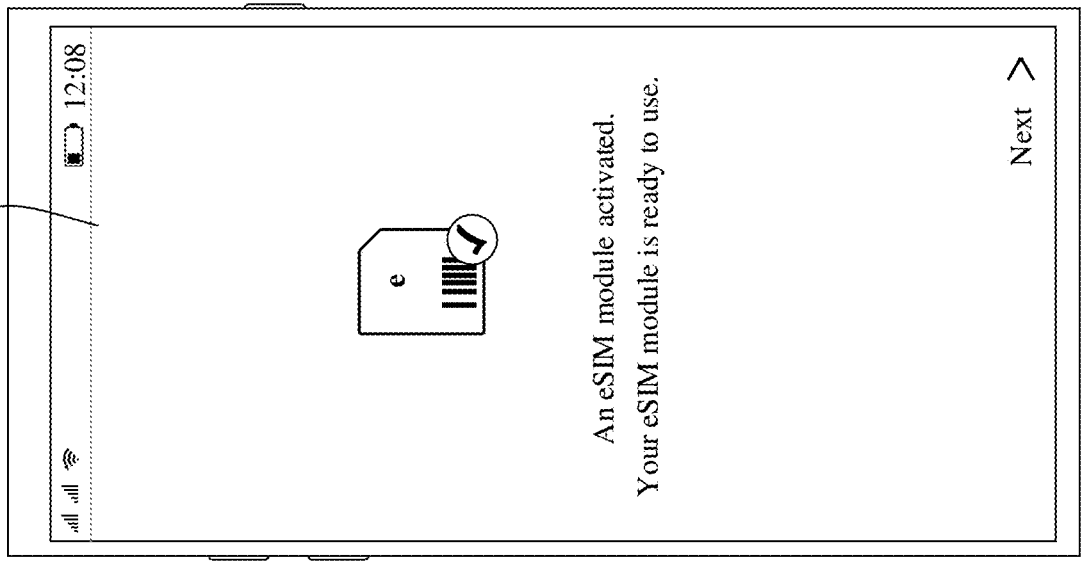
Figure 11I:
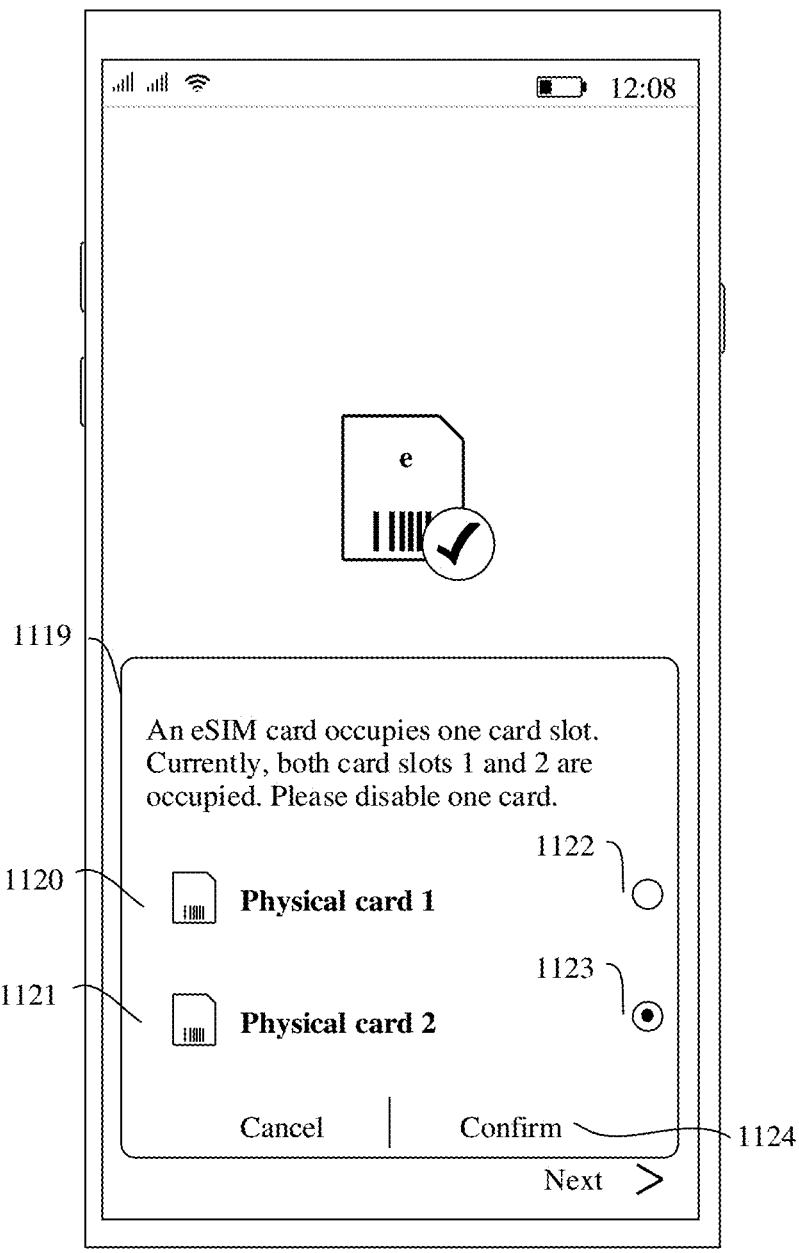

On presentation of the SIM module management interface, a SIM module management interface 1101 shown in FIG. 11A may be used. An icon "card 1" 1102 corresponds to a plug-in SIM module 1 inserted into the SIM interface 1, and a control, for example, a button 1105, corresponding to the icon "card 1" 1102 may be configured to set the plug-in SIM module 1. An icon "card 2" 1103 corresponds to the plug-in SIM module 2 inserted into the SIM interface 2, and a control, for example, a control 1106, corresponding to the icon "card 2" 1103 may be configured to set the plug-in SIM module 2. An icon "eSIM" 1104 corresponds to the eSIM module, and a control, for example, a control 1107, corresponding to the icon "eSIM" 1104 may be configured to set the eSIM module. If the user wants to add a new eSIM module to the mobile phone, as shown in FIG. 11B, the user may perform a tap operation on an addition button 1109 on an eSIM module setting interface 1108; alternatively, when the mobile phone is powered on for the first time, the mobile phone may provide an entry for adding an eSIM module in a startup wizard process, and the user may perform a tap operation on an eSIM module addition button on the startup wizard interface. In response to the tap operation on the addition button 1109, as shown in FIG. 11C, the mobile phone check whether there is an available eSIM profile, and may display a waiting interface 1110 for adding the eSIM module. If the mobile phone finds that there is an available eSIM profile, as shown in FIG. 11D, an interface 1111 may be displayed, and a prompt box 1112 is displayed. The prompt box 1112 is used to prompt the user that the available eSIM profile has been found, and ask the user whether to activate the eSIM profile. In this case, the user may tap a direct activation button 1113. In response to the tap operation performed by the user on the direct activation button 1113, the mobile phone may activate the eSIM profile. As shown in FIG. 11F, the mobile phone may further display a waiting interface 1115 for activating the eSIM module. If the mobile phone finds that there is no available eSIM profile, a camera of the mobile phone may be turned on, and as shown in FIG. 11E, a scanning interface 1114 is displayed, so that the user scans, by using the mobile phone, a corresponding QR code provided by a carrier to obtain the eSIM profile from a server of the carrier. Alternatively, the user can select a QR code saved in a gallery or manually enter a corresponding number, so that the mobile phone obtains the eSIM profile. After obtaining the eSIM profile, the mobile phone may activate the eSIM profile. After the eSIM profile is successfully activated, as shown in 11G, the mobile phone may display a prompt interface 1116, to prompt the user that the new eSIM module has been successfully added and related functions of the new eSIM module can be used. In addition, when detecting that the new eSIM module is successfully added and activated, the mobile phone may determine that a status of the SIM module in the mobile phone changes. If the mobile phone currently has an empty card slot, as shown in FIG. 11H, an interface prompt card 1117 is displayed on a user interface of the mobile phone, to prompt the user that the eSIM card occupies one card slot when being used. Currently, the card slot 1 is occupied, and the eSIM card may be download to the card slot 2. The user may tap an icon "OK" 1118 to download the eSIM card to the card slot 2. If the mobile phone currently does not have an empty card slot, as shown in FIG. 11I, an interface prompt card 1119 is displayed on a user interface of the mobile phone, to prompt the user that the eSIM card occupies one card slot when being used. Currently, both card slot 1 and card slot 2 are occupied, and the user may select to disable one card. The user may perform a tap operation on a control 1122 corresponding to an icon "physical card 1" 1120 or a control 1123 corresponding to an icon "physical card 2" 1121, and then tap an icon "OK" 1124 to confirm a disabled physical card.

Figure 12A:
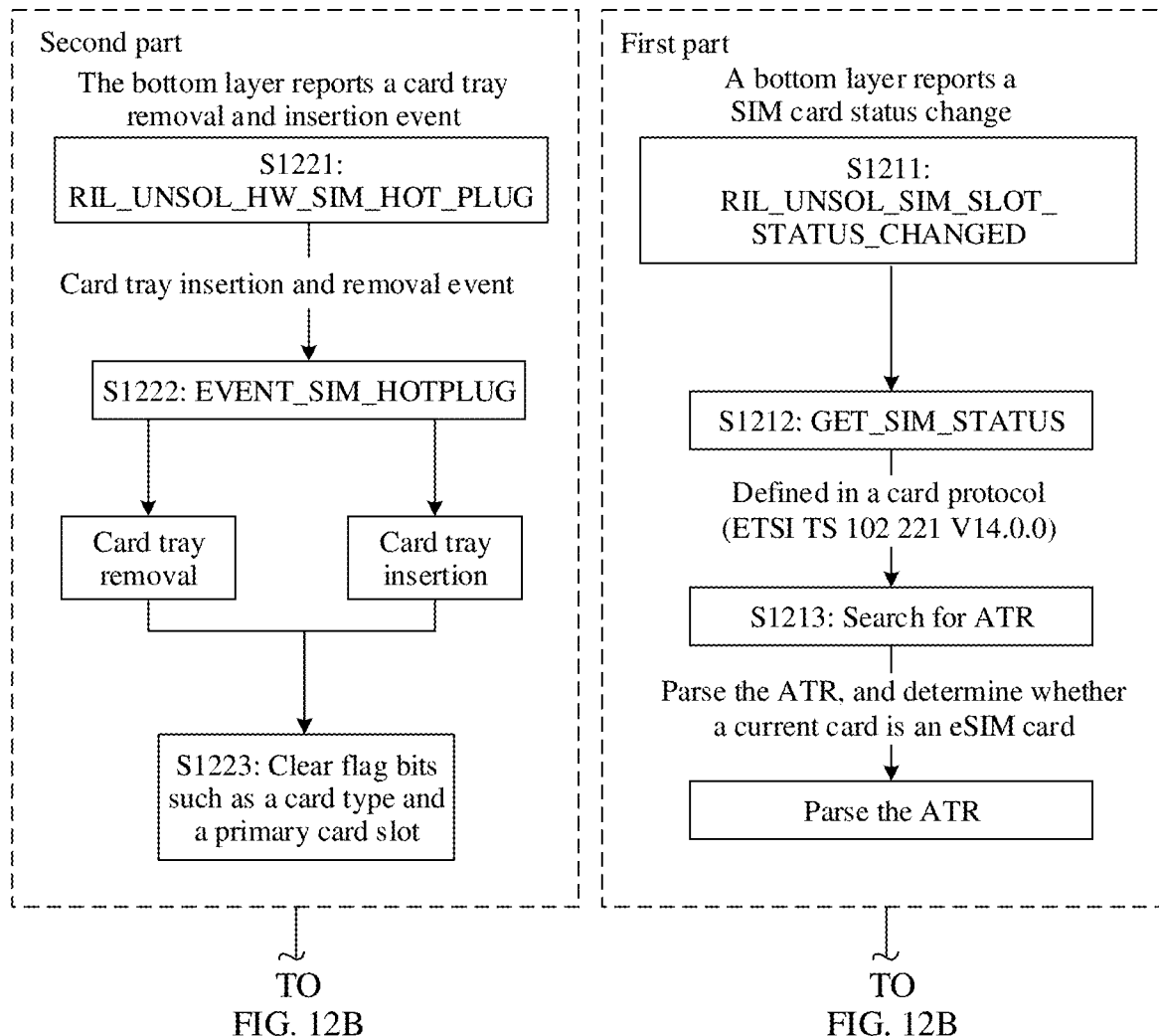
FIG. 12 is a schematic flowchart of still another SIM module management method according to an embodiment of this application.
Figure 12B:
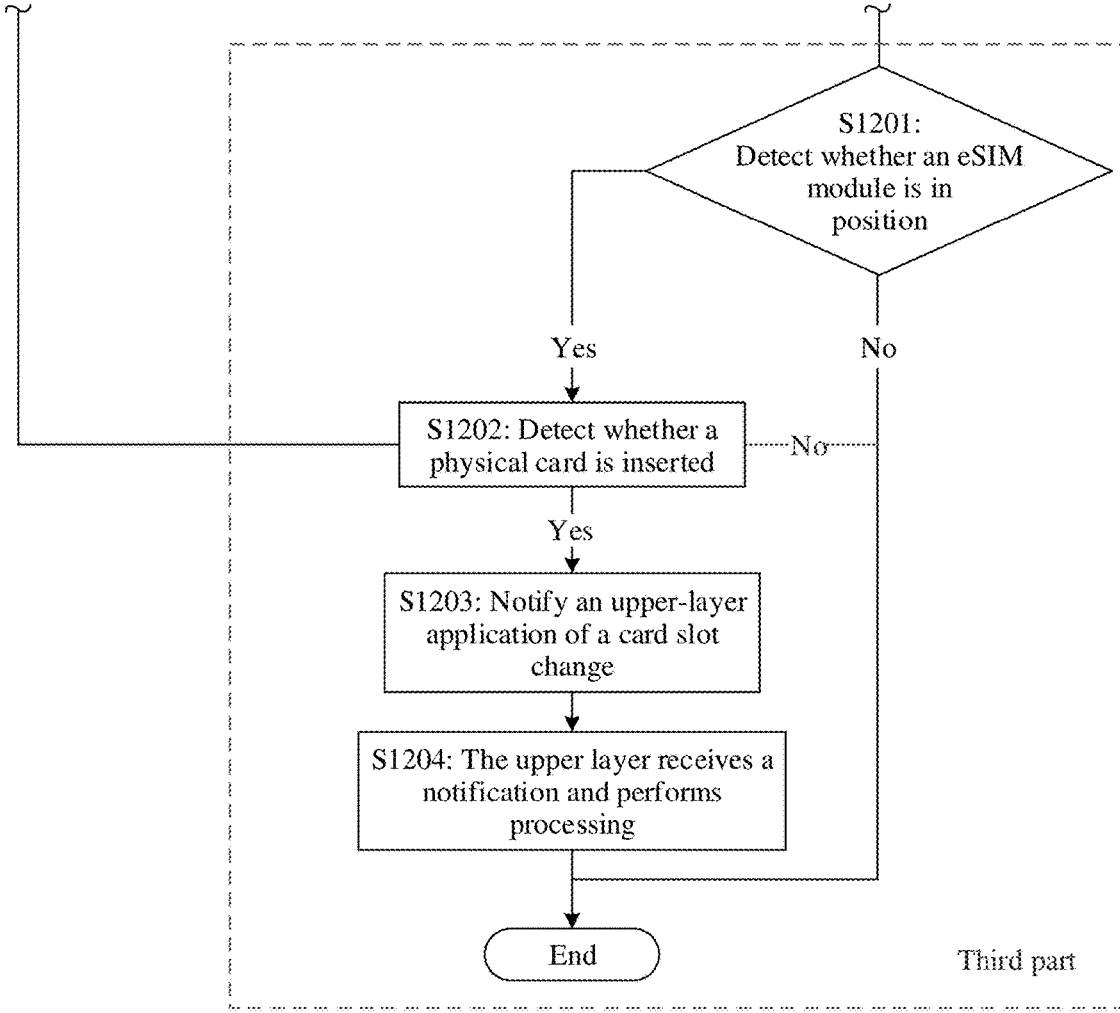

To help one of ordinary skilled in the art understand internal implementation about whether a physical card is inserted into a SIM module interface and an eSIM module is in position in FIG. 8 and FIG. 10, in some embodiments, a detection method shown in FIG. 12A and FIG. 12B is performed. Refer to FIG. 12A and FIG. 12B. The detection method includes a first part, a second part, and a third part. In the first part, a card slot status is detected; in the second part, a card tray insertion and removal event is detected; and in the third part, an application layer is instructed to perform processing.

For the first part, in operation 1211, a bottom layer reports a SIM card status change (RIL_UNSOL_SIM_SLOT_STATUS_CHANGED), and a SIM card status change of a card slot is reported from the bottom layer and recorded each time. In operation 1212, the SIM card status (GET_SIM_STATUS) is obtained when the SIM card status changes. In operation 1213, ATR is searched from the obtained SIM card status, where the ATR is defined in a card protocol (ETSI TS 102 221 V14.0.0). In operation 1214, the ATR is parsed, and whether a current card is an eSIM card is determined by parsing a field in the ATR.

For the second part, in operation 1221, the bottom layer reports a card tray removal and insertion event (RIL_UNSOL_HW_SIM_HOT_PLUG), that is, a card tray removal and insertion status is reported from the bottom layer when a physical card is inserted or removed. Operation 1222: detect the card tray insertion and removal event EVENT_SIM_HOTPLUG, including two types of events: card tray removal and card tray insertion. Operation 1223: clear flag bits such as a card type and a primary card slot. Regardless of whether a card tray is removed or inserted, the flag bits such as the card type and the primary card slot are cleared, and a physical card type, an ICCID, a primary card slot location, and the like are re-obtained.

For the third part, in operation 1201, whether the eSIM is in position is determined by using the ATR obtained in the first part. If the eSIM is not in position, that is, in hardware, the eSIM module is not powered on, a task ends. If the eSIM is in position, whether a physical card is inserted is determined. If one or two physical cards are inserted, operation 1203 is further performed. If no physical card is inserted, a task ends. In the operation 1203, an upper-layer application is notified of a card slot change, and then operation 1204 is further performed. In the operation 1204, the upper layer receives a notification and performs processing, for example, performs the operation 803 and subsequent operations in FIG. 8, and for another example, performs the operation 1003 and subsequent operations in FIG. 10.

Figure 13:
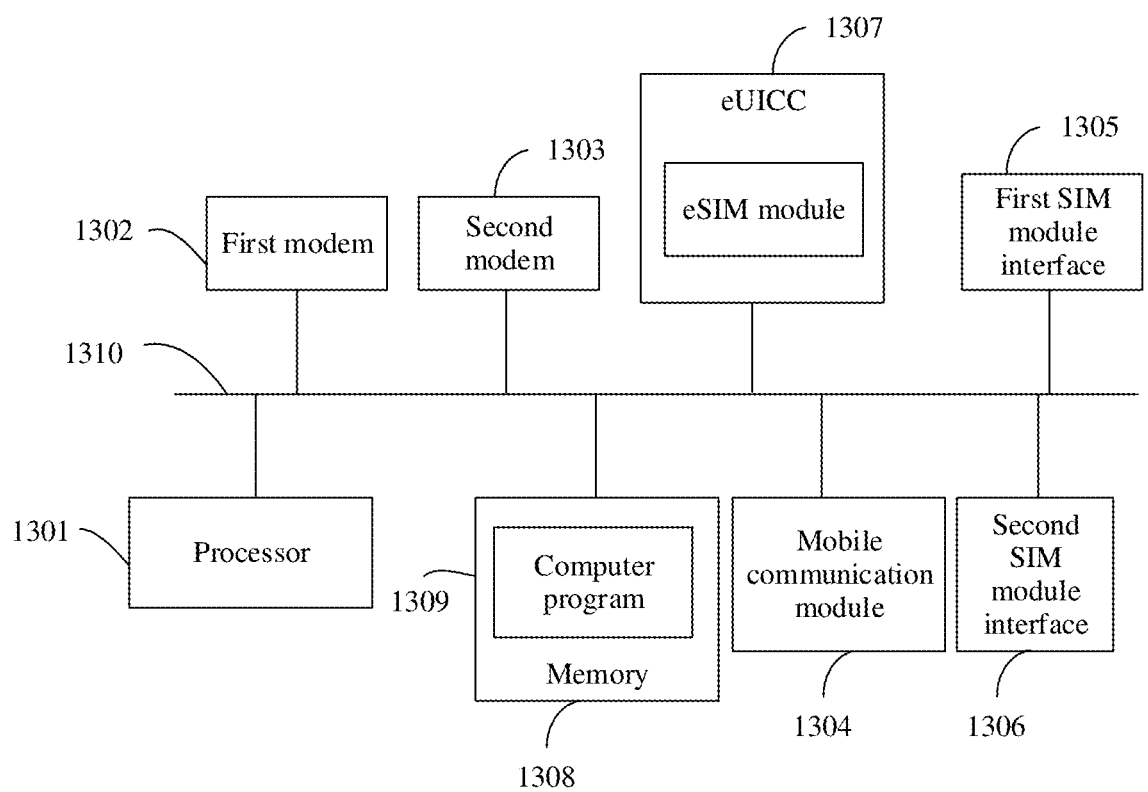
FIG. 13 is a schematic diagram of a structure of another electronic device according to an embodiment of this application.

Some other embodiments of this application further provide an electronic device. As shown in FIG. 13, the electronic device may include a processor 1301, a first modem 1302, a second modem 1303, a mobile communication module 1304, a first SIM module interface 1305, a second SIM module interface 1306, an eUICC 1307, and a memory 1308. The eUICC 1307 is configured to store an eSIM module. The foregoing components may be connected by using one or more communication buses 1310. The memory 1308 is configured to store one or more computer programs 1309. The one or more computer programs 1309 are configured to be executed by the processor 1301. The one or more computer programs 1309 include instructions, and the instructions may be used to perform operations performed by the electronic device (such as the mobile phone) in the foregoing embodiments.

The foregoing descriptions about implementations allow one of ordinary skilled in the art to understand that, for the purpose of convenient and brief description, division into the foregoing functional modules is used as an example for illustration. In actual application, the foregoing functions may be allocated to different functional modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, the division into modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An electronic device, comprising:
   a first modem,
   a second modem,
   a mobile communication module,
   a first subscriber identity module (SIM) module interface,
   a second SIM module interface,
   an embedded universal integrated circuit card (eUICC) configured to store an embedded subscriber identity module (eSIM) module, a first smart card interface (SCI), and a second SCI; and
   a processor coupled to the first modem, the second modem, the mobile communication module, the first SIM module interface, the second SIM module interface, and the eUICC, wherein
   one end of the first SCI is coupled to the processor, and the other end is coupled to the second SIM module interface and the eUICC;
   one end of the second SCI is coupled to the processor, and the other end is coupled to the first SIM module interface and the eUICC; and
   the processor is configured to control a connection relationship between the first SIM module interface, the second SIM module interface, and the eUICC and the first modem and the second modem.

2. The electronic device according to claim 1, wherein the processor is further configured to:
   when the eUICC is connected to the first SCI and detected that a second plug-in SIM module is connected to the second SIM module interface and a first plug-in SIM module is connected to the first SIM module interface, provide first prompt information used to prompt that at most two of the first plug-in SIM module, the second plug-in SIM module, and the eSIM module are simultaneously used.

3. The electronic device according to claim 1, wherein the processor is further configured to:
   when the eUICC is connected to the first SCI and detected that a second plug-in SIM module is connected to the second SIM module interface and the first SIM module interface is not connected to a first plug-in SIM module, automatically connect the eUICC to the second SCI, and connect the second SIM module interface to the first SCI.

4. The electronic device according to claim 1, wherein the processor is further configured to:
when the eUICC is connected to the first SCI and detected that a second plug-in SIM module is connected to the second SIM module interface and the first SIM module interface is not connected to a first plug-in SIM module, provide second prompt information used to prompt whether to switch the eUICC to the first SIM module interface.

5. The electronic device according to claim 4, wherein the processor is further configured to:
when an input operation performed based on the second prompt information is received and the eUICC is kept connected to the first SCI, provide third prompt information used to prompt to connect the second plug-in SIM module to the first SIM module interface.

6. The electronic device according to claim 1, wherein when detecting that the eSIM module is installed and activated, the processor is further configured to perform following operations:
obtaining card information of the eSIM module; and
if the first SIM module interface is not connected to a first plug-in SIM module and the second SIM module interface is connected to a second plug-in SIM module, downloading the eSIM module to the first SIM module interface.

7. The electronic device according to claim 1, wherein when detecting that the eSIM module is installed and activated, the processor is further configured to perform following operations:
obtaining card information of the eSIM module; and
if the first SIM module interface is not connected to a first plug-in SIM module and the second SIM module interface is connected to a second plug-in SIM module, providing fourth prompt information used to prompt to download the eSIM module to the first SIM module interface.

8. The electronic device according to claim 1, wherein when detecting that the eSIM module is installed and activated, the processor is further configured to perform following operations:
obtaining card information of the eSIM module; and
if the first SIM module interface is connected to a first plug-in SIM module and the second SIM module interface is connected to a second plug-in SIM module, providing fifth prompt information used to prompt to disable the first plug-in SIM module or the second plug-in SIM module.

9. A subscriber identity module (SIM) module management method applied to an electronic device comprising:
a processor,
a first SIM module interface,
a second SIM module interface, and
an embedded universal integrated circuit card (eUICC) configured to store an embedded subscriber identity module (eSIM) module and a first smart card interface (SCI), wherein
one end of the first SCI is coupled to the processor, and the other end is coupled to the second SIM module interface and the eUICC; and the electronic device is connected to a network through either of a second plug-in SIM module and a currently activated eSIM module in the eUICC, and a first plug-in SIM module; and the method comprising:
when the eUICC is connected to the first SCI and detected that the second SIM module interface is connected to the second plug-in SIM module, performing following operations:
detecting whether the first SIM module interface is connected to the first plug-in SIM module; and
if the first SIM module interface is connected to the first plug-in SIM module, providing sixth prompt information used to prompt to connect the second SIM module interface to the second plug-in SIM module or the eSIM module; or
if the first SIM module interface is not connected to the first plug-in SIM module, providing seventh prompt information used to prompt to connect the second plug-in SIM module to the first SIM module interface.

10. A subscriber identity module (SIM) module management method applied to an electronic device connected to a network through two of a first plug-in SIM module, a second plug-in SIM module, and a currently activated eSIM module in an embedded universal integrated circuit card (eUICC), the method comprising:
when the eUICC is connected to a first smart card interface (SCI) and detected that the second plug-in SIM module is connected to a second SIM module interface, performing following operations:
detecting whether a first SIM module interface is connected to the first plug-in SIM module; and
if the first plug-in SIM module is connected to the first SIM module interface, providing first prompt information used to prompt that at most two of the first plug-in SIM module, the second plug-in SIM module, and the eSIM module are simultaneously used.

11. The method according to claim 10, further comprising:
if the first SIM module interface is not connected to the first plug-in SIM module, automatically connecting the eUICC to a second SCI.

12. The method according to claim 10, further comprising:
if the first SIM module interface is not connected to the first plug-in SIM module, providing second prompt information used to prompt whether to switch the eUICC to the first SIM module interface.

13. The method according to claim 12, wherein after providing the second prompt information, the method further comprises:
when an input operation performed based on the second prompt information is received and the eUICC is kept connected to the first SCI, providing third prompt information used to prompt to connect the second plug-in SIM module to the first SIM module interface.

* * * * *